US010255939B2

(12) United States Patent
Hu et al.

(10) Patent No.: US 10,255,939 B2
(45) Date of Patent: Apr. 9, 2019

(54) RECORDING MEDIUM FOR HEAT ASSISTED MAGNETIC RECORDING AND METHOD OF FORMING THE SAME

(71) Applicant: AGENCY FOR SCIENCE, TECHNOLOGY AND RESEARCH, Singapore (SG)

(72) Inventors: Jiang Feng Hu, Singapore (SG); Wen Huei Tsai, Singapore (SG); Kiat Min Cher, Singapore (SG); Binni Varghese, Singapore (SG); Chee Beng Lim, Singapore (SG); Jian Zhong Shi, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 255 days.

(21) Appl. No.: 15/172,105

(22) Filed: Jun. 2, 2016

(65) Prior Publication Data
US 2017/0018286 A1   Jan. 19, 2017

(30) Foreign Application Priority Data

Jul. 16, 2015  (SG) .......................... 10201505605W

(51) Int. Cl.
*G11B 5/66* (2006.01)
*G11B 5/84* (2006.01)
*G11B 5/73* (2006.01)
*G11B 5/00* (2006.01)

(52) U.S. Cl.
CPC .......... *G11B 5/8404* (2013.01); *G11B 5/7325* (2013.01); *G11B 2005/0021* (2013.01)

(58) Field of Classification Search
CPC ................. G11B 5/732; G11B 5/7325; G11B 2005/0021
See application file for complete search history.

(56) References Cited

U.S. PATENT DOCUMENTS

| 9,263,076 B1* | 2/2016 | Peng ..................... G11B 5/7325 |
| 2012/0251842 A1* | 10/2012 | Yuan ..................... G11B 5/7325 428/800 |
| 2013/0130063 A1* | 5/2013 | Choi ..................... G11B 5/645 428/828 |
| 2013/0201805 A1* | 8/2013 | Seigler ..................... G11B 5/64 369/13.24 |

* cited by examiner

*Primary Examiner* — Holly C Rickman
(74) *Attorney, Agent, or Firm* — Womble Bond Dickinson (US) LLP

(57) ABSTRACT

Various aspects of this disclosure provide a recording medium for heat-assisted-magnetic-recording (HAMR). The recording medium may include a substrate. The recording medium may further include a recording layer. The recording medium may also include a thermal control layer between the recording layer and the substrate. The thermal control layer may have a thermal conductivity that increases with increasing temperature.

19 Claims, 22 Drawing Sheets

| Std Order | Run Order | Center Pt | Blocks | N$_2$ gas flow | Working P | Sputter Power |
|---|---|---|---|---|---|---|
| 4 | 1 | 1 | 1 | 40.0 | 40 | 800 |
| 1 | 2 | 1 | 1 | 15.0 | 20 | 800 |
| 3 | 3 | 1 | 1 | 15.0 | 40 | 200 |
| 2 | 4 | 1 | 1 | 40.0 | 20 | 200 |
| 5 | 5 | 0 | 1 | 27.5 | 30 | 500 |

900a

900b

900c

RECORDING MEDIUM FOR HEAT ASSISTED MAGNETIC RECORDING AND METHOD OF FORMING THE SAME

CROSS-REFERENCE TO RELATED APPLICATION

This application claims the benefit of priority of Singapore application No. 10201505605W filed Jul. 16, 2015, the contents of it being hereby incorporated by reference in its entirety for all purposes.

TECHNICAL FIELD

Various aspects of this disclosure relate to heat assisted magnetic recording media and methods of forming the same.

BACKGROUND

Iron platinum (FePt) is the most promising candidate for heat assisted magnetic recording (HAMR) applications. Currently, there are lots of technical challenges that need to be overcome before FePt based composite films may be used for HAMR media applications. The most critical challenges for HAMR technology relate to reliability issues due to the deterioration of the field generated by the near field transducer (NFT) under high temperature working conditions.

SUMMARY

Various aspects of this disclosure provide a recording medium for heat assisted magnetic recording (HAMR). The recording medium may include a substrate. The recording medium may further include a recording layer. The recording medium may also include a thermal control layer between the recording layer and the substrate. The thermal control layer may have a thermal conductivity that increases with temperature.

Various aspects of this disclosure provide a method of forming a recording medium for heat assisted magnetic recording (HAMR). The method may include providing a substrate. The method may further include forming a recording layer. The method may also include forming a thermal control layer between the recording layer and the substrate. The thermal control layer may have a thermal conductivity that increases with temperature.

BRIEF DESCRIPTION OF THE DRAWINGS

The invention will be better understood with reference to the detailed description when considered in conjunction with the non-limiting examples and the accompanying drawings, in which:

FIG. 6A is a table illustrating the various conditions in which experiments have been carried out to form copper (I) oxide films according to various embodiments.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Figure 1:
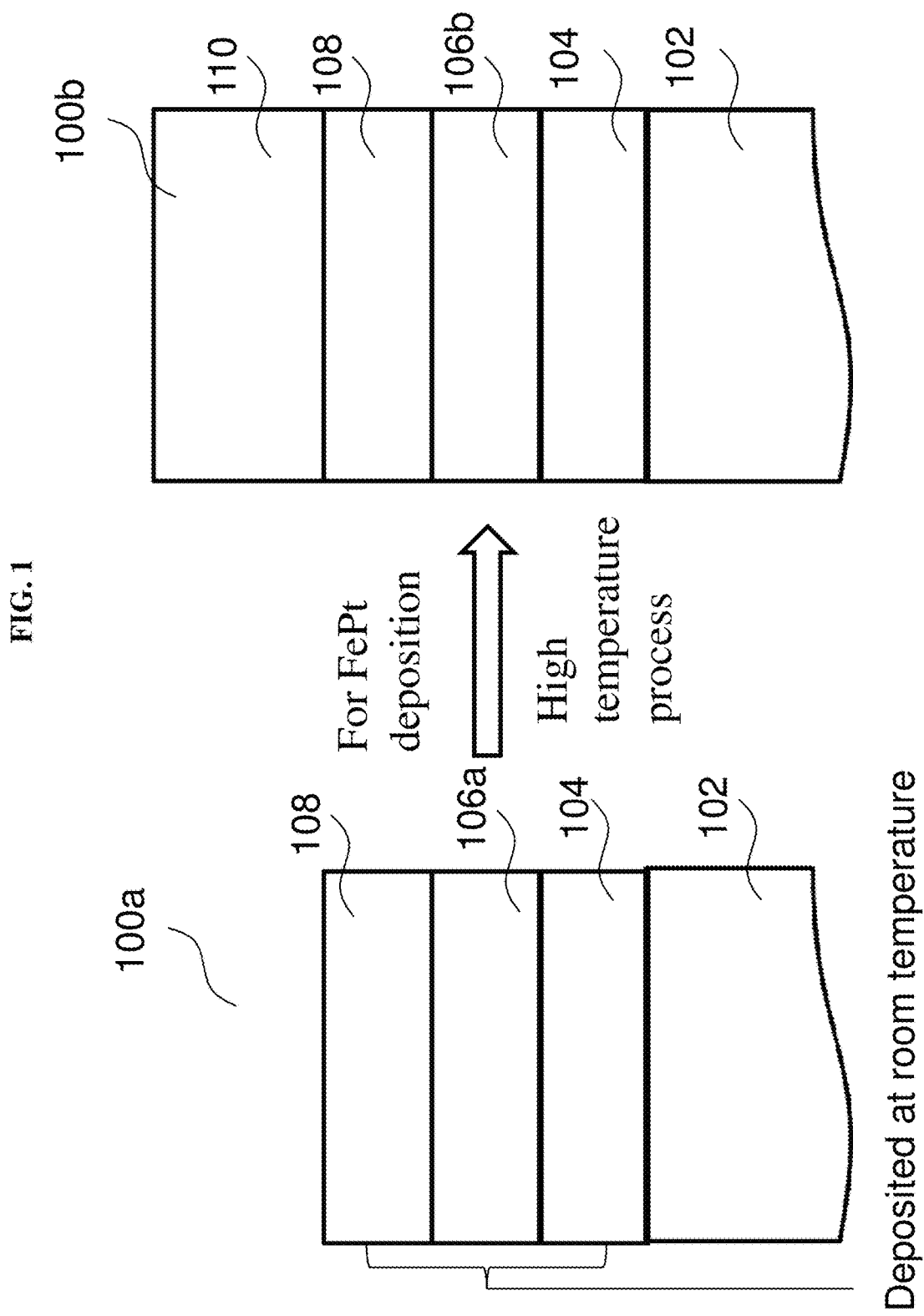
FIG. 1 is a schematic of forming a recording medium.

FIG. 1 is a schematic of forming a recording medium. A glass substrate 102 is provided. Seedlayer 104, copper nitride ($Cu_3N$) layer 106a, and a magnesium oxide (MgO) based intermediate layer 108 may be formed over the glass substrate 102 at room temperature, thereby forming a stack 100a. Iron platinum (FePt) may then be deposited in a high temperature process to form an iron platinum based (FePt—X) recording layer 110, where X may be carbon, titanium oxide ($TiO_2$) etc. The copper nitride ($Cu_3N$) layer 106a may also be converted to a copper layer 106b to form recording medium 100b. The copper nitride ($Cu_3N$) layer 106a may enable heteroepitaxial growth of MgO, while the copper layer 106b may enable a fast cooling rate.

Using a smaller laser power to heat up the FePt based recording media to the desired temperature for writing may be the key to address the reliability issues. From HAMR media thermal design viewpoint, there has always been a trade-off between the required high peak temperature (high media signal to noise ratio (SNR)) and the fast cooling rate (high thermal gradient).

Various embodiments may relate to a medium including a thermal control layer with temperature dependent thermal conductivity. Various embodiments may relate to a medium wherein the thermal conductivity is proportional to the temperature. The thermal control layer may thus act as the thermal barrier layer with low thermal conductivity to stop or reduce the heat flow during the medium heating process (so that the peak temperature may be reached more easily) and convert to a better thermal conductor with increased thermal conductivity to allow the heat flow along the perpendicular direction once a certain temperature is reached (so as to achieve a faster cooling rate).

Various embodiments may allow the requirement to the output power of the NFT to be reduced. The thermal control layer may have a better thermal control to allow utilization of smaller laser power to heat up the recording medium. Also, the thermal control layer may allow the fast conduction of heat away to allow a high thermal gradient for better writing on the medium.

The thermal control layer material may have a dramatic or significant temperature dependent thermal conductivity (and/or electrical conductivity). Besides the temperature dependent thermal conductivity, the thermal control layer may also have the proper crystalline structure to induce the growth of the (001) texture FePt film. Various embodiments may relate to a HAMR medium including a thermal control layer which allows the epitaxial growth of magnesium oxide (MgO) underlayer and iron-platinum (FePt) recording layer.

Figure 2:
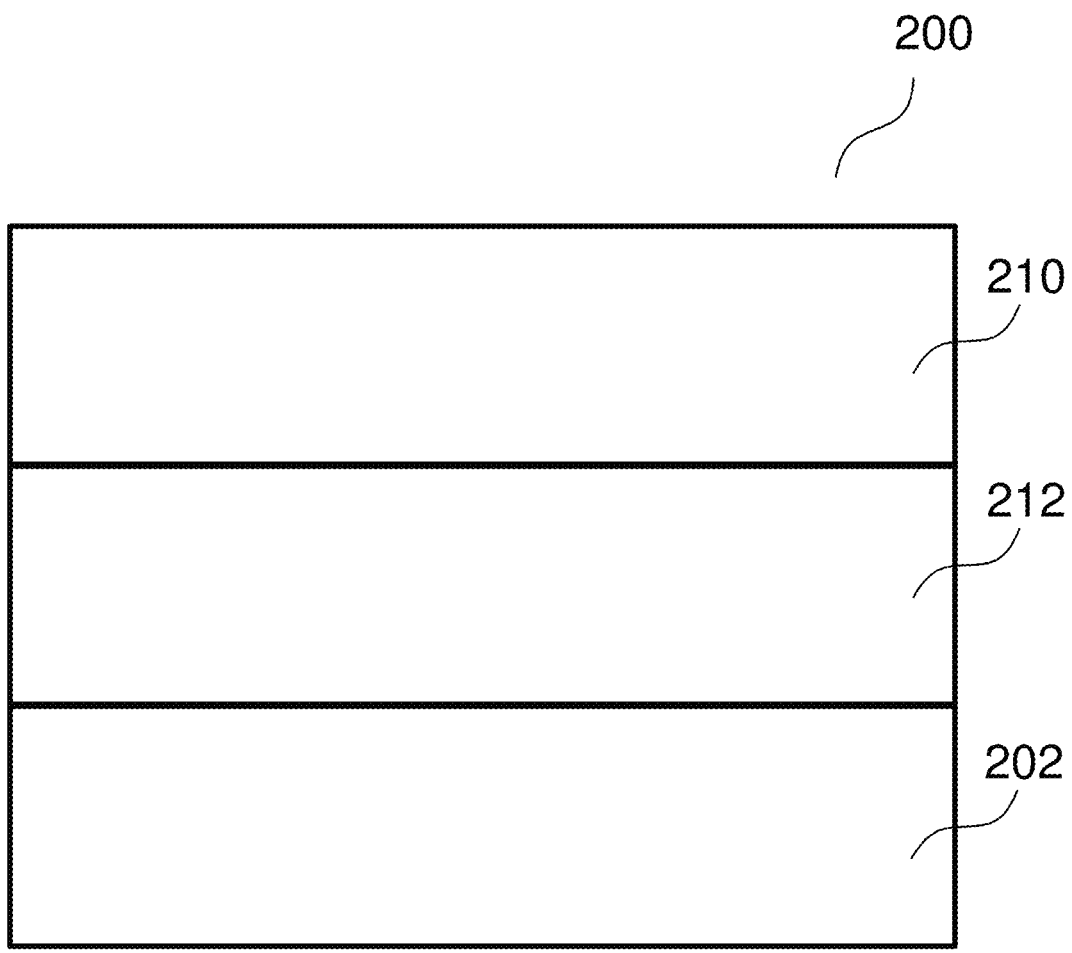
FIG. 2 illustrates a schematic of a recording medium according to various embodiments.

Various embodiments may provide a recording medium for heat assisted magnetic recording (HAMR). FIG. 2 illustrates a schematic of a recording medium 200 according to various embodiments. The recording medium 200 may include a substrate 202. The recording medium may further include a recording layer 210. The recording medium 200 may also include a thermal control layer 212 between the recording layer 210 and the substrate 202. The thermal control layer 212 may have a thermal conductivity that increases with temperature.

In other words, the recording medium 200 may have a substrate 202, a thermal control layer 212 over the substrate, and a recording layer 210 over the thermal control layer 212. The thermal control layer 212 may have a thermal conductivity that is dependent on temperature in which the thermal control layer 212 is at. As temperature of the thermal control layer 212 increases, the conductivity of the thermal control layer 212 may also increase.

In heat-assisted-magnetic-recording (HAMR), the recording medium may be temporarily and locally heated to effectively reduce the coercivity or magnetization switching field of the recording medium such that a magnetic write field applied from a writer may be able to write data or information to the recording medium during the writing process. The heat may be provided by a laser.

Various embodiments may seek to have better thermal control. Various embodiments may seek to provide a function layer (i.e. thermal control layer 212) with temperature dependent thermal conductivity which stop or reduce heat flow (e.g. from the recording layer to the underlying layers) during the heating process of the medium 200, and which may be converted to a good thermal conductor to allow or increase heat flow (e.g. substantially along the perpendicular direction which crosses the substrate 200, the thermal control layer 212, and the recording layer 210) once a certain temperature is reached.

Various embodiments may seek to allow utilization of a smaller laser power to heat up the recording medium 200, followed by fast conduction of heat away. Various embodiments may seek to increase the thermal gradient for better writing on the medium 200.

A layer over a further layer may mean that the layer is on the further layer, or the layer is separated from the further layer by one or more intervening layers.

In various embodiments, the thermal control layer 212 is of a suitable crystalline or polycrystalline structure to allow epitaxial growth of the overlying layers e.g., the recording layer 210. In other words, the thermal control layer 212 is a crystalline or polycrystalline layer.

In various embodiments, the substrate 202, the thermal control layer 212, and the recording layer 210 may form a stack arrangement.

In various embodiments, the thermal control layer 212 may include copper (I) oxide ($Cu_2O$). In various other embodiments, the thermal control layer 212 may include any suitable material from a group consisting of vanadium (IV) oxide ($VO_2$), titanium (III) oxide ($Ti_2O_3$) and niobium dioxide ($NbO_2$). Necessary material property control may be needed to tune the transition temperature to match with the writing temperature for HAMR application. The transition temperature of $VO_2$ may be about 340K, the transition temperature of $Ti_2O_3$ may be a range between about 400 K to about 600 K, and the transition temperature of $NbO_2$ may be about 1081 K. In various embodiments, the thermal control layer 212 may include any suitable metal-insulator-transition material.

In various embodiments, the thermal control layer 212 may be doped with nitrogen.

In various embodiments, the recording medium 200 may further include a heat sink layer between the thermal control layer 212 and the substrate 202. The heat sink layer may include copper (Cu). The heat sink layer may be formed by depositing copper nitride ($Cu_3N$). The copper nitride may subsequently be heated to form copper (Cu). In other words, the copper (Cu) may be formed by depositing copper nitride and heating the copper nitride ($Cu_3N$). The nitrogen, i.e. nitrogen atoms, generated during the heating may travel or diffuse to the thermal control layer 212. The nitrogen may be absorbed by the thermal control layer 212. The thermal control layer 212 may consequently be doped with nitrogen atoms. In various other embodiments, the thermal control layer 212 may be doped with other transitional metal atoms such as nickel atoms or manganese atoms.

In various embodiments, the mechanical properties of the Cu-based heat sink layer may also be tuned via element doping with at least one of zirconium (Zr), palladium (Pd), tungsten (W), etc.

The recording medium 200 may further include an underlayer between the recording layer 210 and the substrate 202. In various embodiments, the underlayer may be between the recording layer and the thermal control layer 212. The underlayer may include at least one of magnesium oxide (MgO), titanium carbide (TiC), titanium nitride (TiN) or platinum (Pt). The underlayer may have a crystalline or polycrystalline structure.

In various embodiments, the underlayer may be between the recording layer 210 and the thermal control layer 212.

In various embodiments, the thermal control layer 212 may have a crystal structure that match with the underlayer. By having a similar structure, epitaxial growth of the underlayer on the thermal control layer 212 may be easier. In various embodiments, the thermal control layer 212 may have a (200) texture. In various embodiments, the underlayer may have a (200) texture.

In various embodiments, the thermal control layer 212 may have a thickness selected from a range of about 1 nm to about 20 nm, e.g. about 3 nm to about 6 nm.

The recording layer 210 may include iron-platinum (FePt). The recording layer 210 may include an iron-platinum alloy (FePtX, where X is a third material or element, and may include for instance, one or more of carbon (C), oxide(s) (e.g. titanium oxide ($TiO_2$)), carbide(s), nitride(s), etc. or any combination thereof). A reference to iron-platinum (or FePt) may include a reference to iron-platinum alloy (or FePtX, where X is a third material or element), and vice versa. The recording layer may have a crystalline or polycrystalline structure.

The recording medium 200 may also include a seed layer between the substrate 202 and the thermal control layer 212. The seed layer may be formed on the substrate. The seed layer may include nickel tantalum (NiTa). The seed layer may have an amorphous structure. The seed layer may seek to promote the deposition of the precursor material for subsequent formation of the heat sink layer including the converted material.

In various embodiments, the recording medium 200 may be free of a seedlayer between the substrate 202 and the underlayer.

In various embodiments, the recording medium 200 may further include an overcoat layer on or over the recording layer 210. The overcoat layer may include carbon.

In the context of various embodiments, at least one of the recording layer 210, the heat sink layer and the underlayer may have polycrystalline microstructures.

In various embodiments, the recording medium 200 may be a heat assisted magnetic recording (HAMR) medium.

Figure 3:
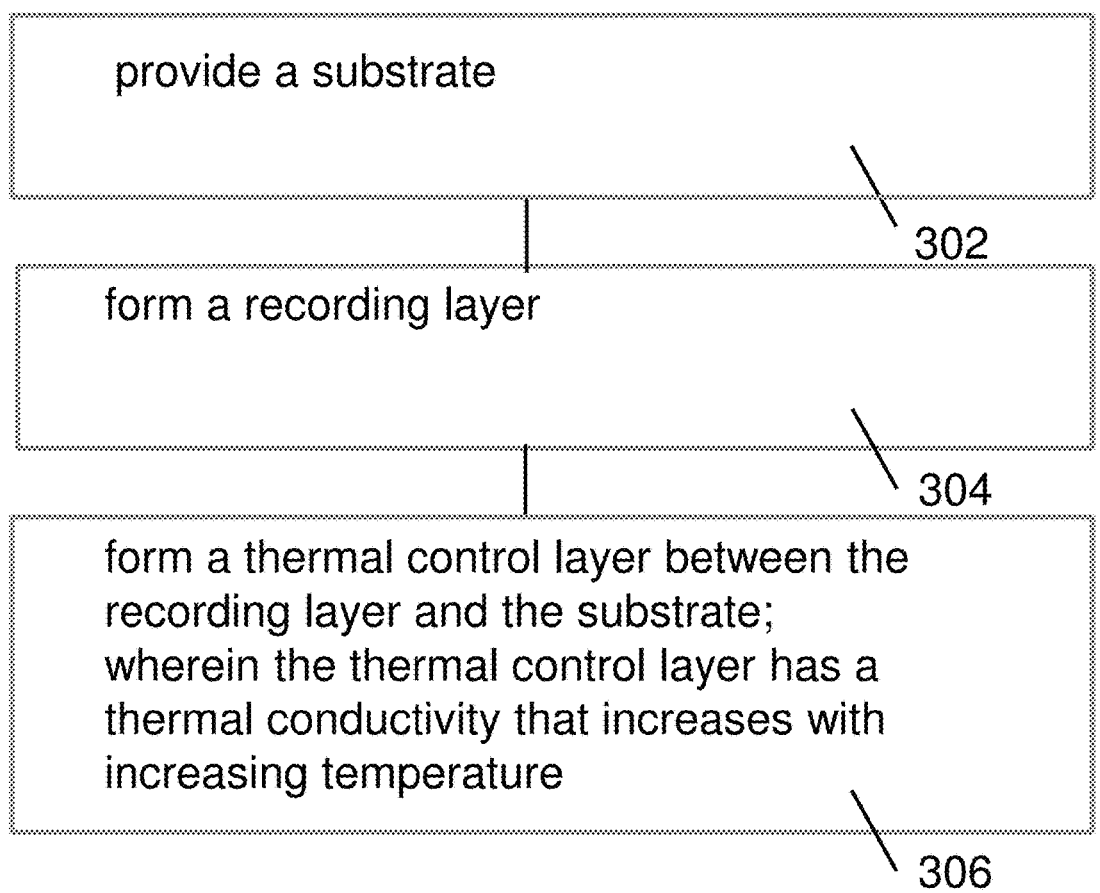
FIG. 3 is a schematic illustrating a method of forming a recording medium for heat-assisted-magnetic-recording (HAMR) according to various embodiments.

Various embodiments may provide a method of forming a recording medium for heat-assisted-magnetic-recording (HAMR). FIG. 3 is a schematic 300 illustrating a method of forming a recording medium for heat assisted magnetic recording (HAMR) according to various embodiments. The method may include, in 302, providing a substrate. The method may further include, in 304, forming a recording layer. The method may also include, in 306, forming a thermal control layer between the recording layer and the substrate. The thermal control layer may have a thermal conductivity that increases with temperature.

In other words, the method to form a recording medium for HAMR may include forming a thermal control layer over the substrate, and forming a recording layer over the thermal control layer. The thermal control layer may have a thermal conductivity that is dependent on temperature in which the thermal control layer is at. As temperature of the thermal control layer increases, the conductivity of the thermal control layer may also increase.

In various embodiments, the thermal control layer may be formed before forming the recording layer. In various embodiments, the thermal control layer may be formed by reactive sputtering.

In various embodiments, the step of forming the recording layer may be carried out at a temperature of between about 400° C. and about 750° C., for example between about 400° C. and about 700° C., between about 400° C. and about 600° C., between about 400° C. and about 500° C., or between about 500° C. and about 750° C.

In various embodiments, the step of forming the thermal control layer may be formed at a temperature of between about 10° C. and about 50° C., e.g. about 15 to about 35° C., e.g. about 20 to about 30° C., e.g. about 20° C. (room temperature).

In various embodiments, the method may further include forming a heat sink layer between the thermal control layer and the substrate.

In various embodiments, the heat sink layer may include copper. In various embodiments, forming the heat sink layer may include depositing a precursor material such as copper nitride ($Cu_3N$). The method may also include heating the precursor material such as copper nitride to form a converted material such as copper. In other words, the heat sink layer may include the converted material such as copper. In various embodiments, heating the precursor material such as copper nitride may form nitrogen. The nitrogen may be absorbed by the thermal control layer. The thermal control layer may be doped with nitrogen, i.e. nitrogen atoms.

The layer include the precursor material such as copper nitride ($Cu_3N$) may be formed before forming the thermal control layer. The thermal control layer may be formed on or over the heat sink layer. The heating may be carried out after the thermal control layer has been formed.

The precursor material may be deposited at a temperature of between about 10° C. and about 50° C., e.g. about 15 to about 35° C., e.g. about 20° C. (room temperature). The precursor material may be heated to a temperature between about 100° C. and about 750° C., for example between about 100° C. and about 600° C., between about 100° C. and about 470° C., between about 100° C. and about 300° C., between about 300° C. and about 750° C., or between about 470° C. and about 750° C., to form the converted material.

In various embodiments, the thermal control layer may include copper (I) oxide ($Cu_2O$).

In various embodiments, the method may further include forming an underlayer between the recording layer and the substrate. The underlayer may include at least one of magnesium oxide (MgO), titanium carbide (TiC), titanium nitride (TiN) and platinum (Pt). The underlayer may be between the recording layer and the thermal control layer. The underlayer may be formed after forming the thermal control layer. The underlayer may be formed before forming the recording layer.

The underlayer may be formed at a temperature of between about 10° C. and about 50° C., e.g. about 15 to about 35° C., e.g. about 20° C. (room temperature).

The thermal control layer may have a thickness selected from a range of about 1 nm to about 20 nm, e.g. about 3 nm to about 6 nm.

The recording layer may include iron-platinum. The recording layer may include an iron-platinum alloy (FePtX, where X is a third material or element, and may include for instance, one or more of carbon (C), oxide(s) (e.g. titanium oxide ($TiO_2$)), carbide(s), nitride(s), etc. or any combination thereof). A reference to iron-platinum (or FePt) may include a reference to iron-platinum alloy (or FePtX, where X is a third material or element), and vice versa.

The method may also include forming a seed layer between the substrate and the thermal control layer. The seed layer may be formed before forming the thermal control layer. The seed layer may be formed before forming the heat sink layer. The seed layer seed layer may include nickel tantalum (NiTa).

The method may further include forming an overcoat layer on or over the recording layer. The overcoat layer may be formed after forming the recording layer.

Various embodiments may relate to a recording medium including a thermal control layer, which may enable or allow a better thermal control for FePtX based HAMR media. In various embodiments, the thermal control layer may be a (200) textured $Cu_2O$ thermal control layer.

In various embodiments, the recording medium may be a full stack HAMR medium.

The $Cu_2O$ layer may have temperature dependent thermal conductivity. The $Cu_2O$ with small thermal conductivity (about 5 W/K*m (i.e. 5 $WK^{-1}m^{-1}$) at room temperature (i.e. about 20° C.)) may allow it to act as the thermal barrier layer, enabling to use a relatively small laser power to heat up the recording medium to the desired temperature. The utilization of the $Cu_2O$ layer may reduce the requirement of the output power from near field transducer (NFT), thus improve the reliability of the HAMR system. The heat control layer may be prepared via reactive sputtering (high deposition rate). The heat control layer may also partially replace the MgO underlayer, which is one of the bottlenecks for mass production due to its low deposition rate. The $Cu_2O$ layer may be integrated into any recording medium or full stack HAMR medium to control the thermal performance of the recording medium. The thickness of the $Cu_2O$ layer may be used to tune the thermal performance of the recording medium to match with the recording head to optimize the overall recording medium performance.

In various embodiments, the recording medium may include a Cu based heat sink layer. The Cu based heat sink layer may be formed via decomposition of the copper nitride layer. The $N_2$ gas released during the high temperature process may deteriorate the surface morphology of the MgO layer. The introduction of the $Cu_2O$ layer may absorb nitrogen atoms released by the copper nitride layer before the nitrogen atoms recombine to form nitrogen molecules, i.e. $N_2$ gas, and may thus lead to improvement in the surface morphology of the recording medium. The recombination of N atoms to $N_2$ molecules may not be complete, i.e. may not be 100%, at high temperature. The uncombined nitrogen atoms may subsequently diffuse into the $Cu_2O$ layer to dope the $Cu_2O$ layer. In addition, the nitrogen doping may cause the thermal conductivity of the $Cu_2O$ layer to be even more significantly varied with the temperature, which may allow the $Cu_2O$ layer to be more helpful to the thermal control of the recording medium.

Various embodiments may relate to a layer structure design with a $Cu_2O$ thermal control layer. Various embodiments may relate to a fabrication process for FePt based HAMR media with the $Cu_2O$ thermal control layer.

The thermal control layer may allow for better thermal management. The thermal control layer may be a thermal barrier layer which slows down the heat flow from the recording layer to the heat sink layer to achieve a higher temperature at a relatively lower laser power. The thermal control layer may be converted to be a good thermal conductor at a relatively higher temperature, e.g. at the writing temperature for HAMR medium. The writing temperature may be near or above the Curie temperature of the material of the recording layer.

Figure 4A:
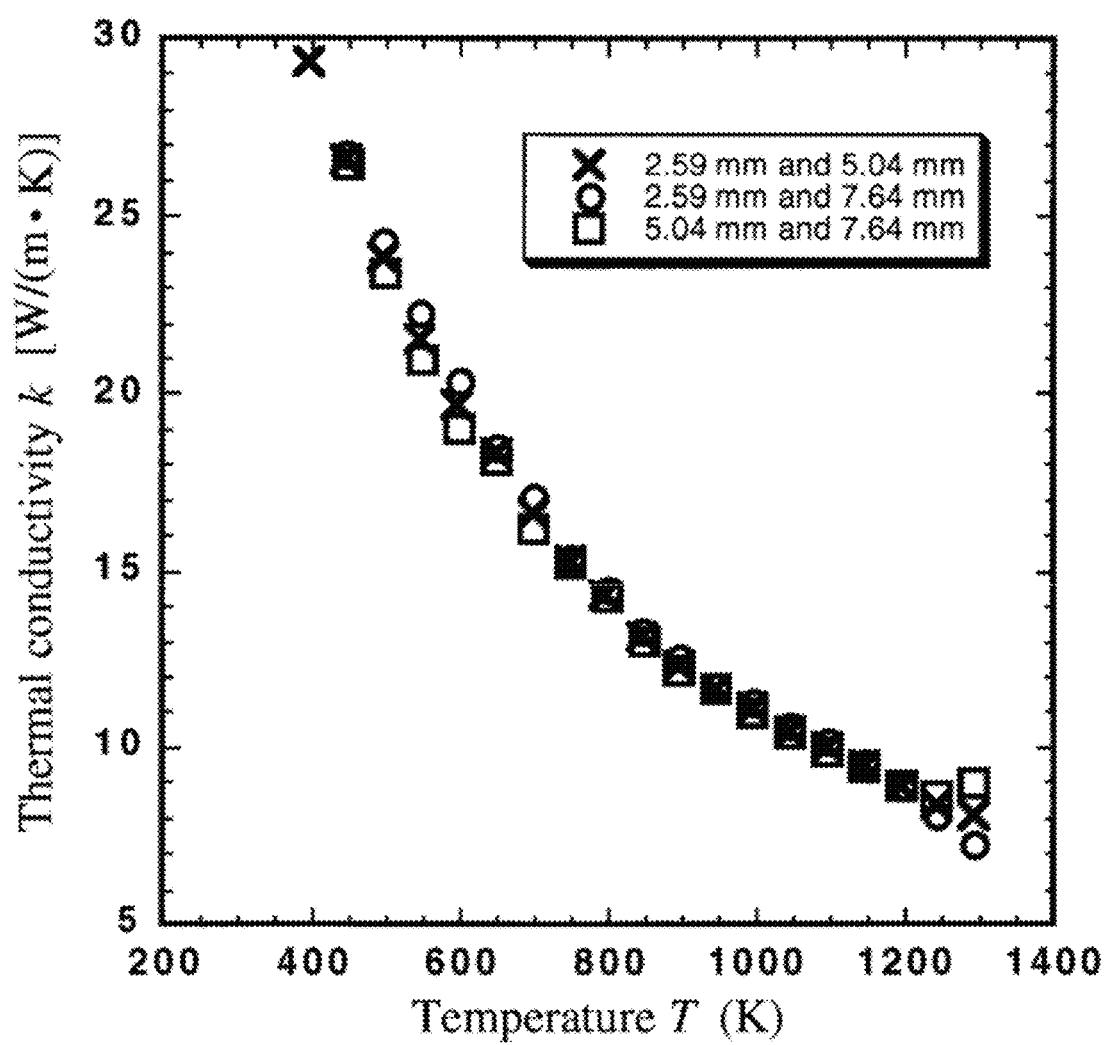
FIG. 4A is a plot of thermal conductivity k (W/(mK)) as a function of temperature T (K) illustrating the variation of the thermal conductivity of magnesium oxide (MgO) as a function of temperature according to various embodiments.
Figure 4B:
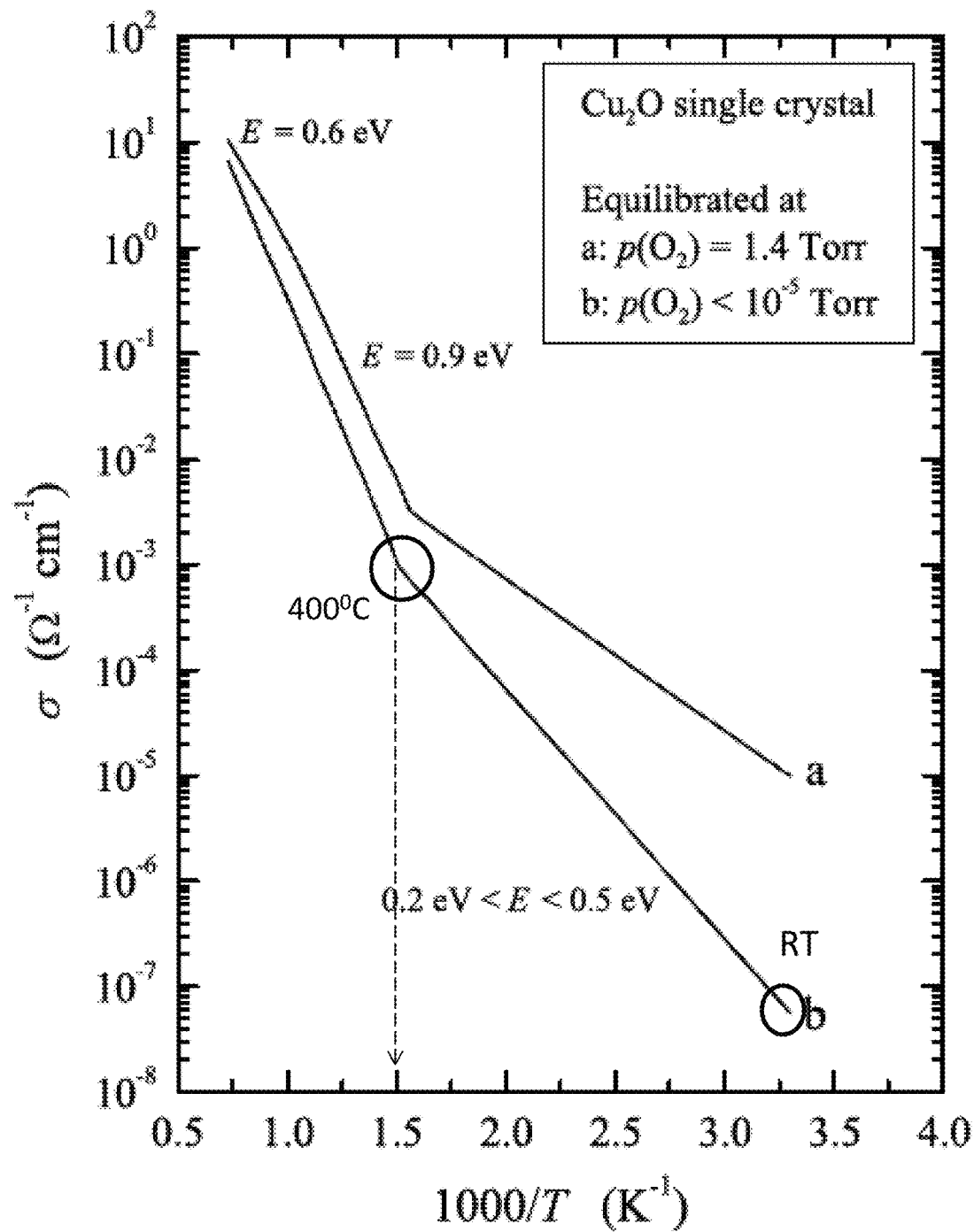
FIG. 4B is a plot of thermal conductivity $\sigma$ ($\Omega^{-1}$ $cm^{-1}$) as a function of the inverse of temperature 1000/T ($K^{-1}$) of copper (I) oxide ($Cu_2O$) according to various embodiments.

FIG. 4A is a plot 400a of thermal conductivity k (W/(m*K)) as a function of temperature T (K) illustrating the variation of the thermal conductivity of magnesium oxide (MgO) as a function of temperature according to various embodiments. FIG. 4B is a plot 400b of thermal conductivity σ ($Ω^{-1}$ $cm^{-1}$) as a function of the inverse of temperature 1000/T ($K^{-1}$) of copper (I) oxide ($Cu_2O$) according to various embodiments. From FIGS. 4A-4B, it may be seen that the thermal conductivity of MgO decreases with increasing temperature, while the thermal conductivity of $Cu_2O$ increases with increasing temperature.

The temperature dependence of the thermal conductivity may be closely related to the temperature dependence of the electrical conductivity of the material.

Other considerations for implementing the thermal control layer into the HAMR stack may include whether the thermal control layer is suitable to maintain the epitaxial growth relationship of the (001) textured FePt film.

In various embodiments, the thermal control layer may include $Cu_2O$. $Cu_2O$ exhibits a significant change of the electrical conductivity as the temperature increases.

Figure 5:
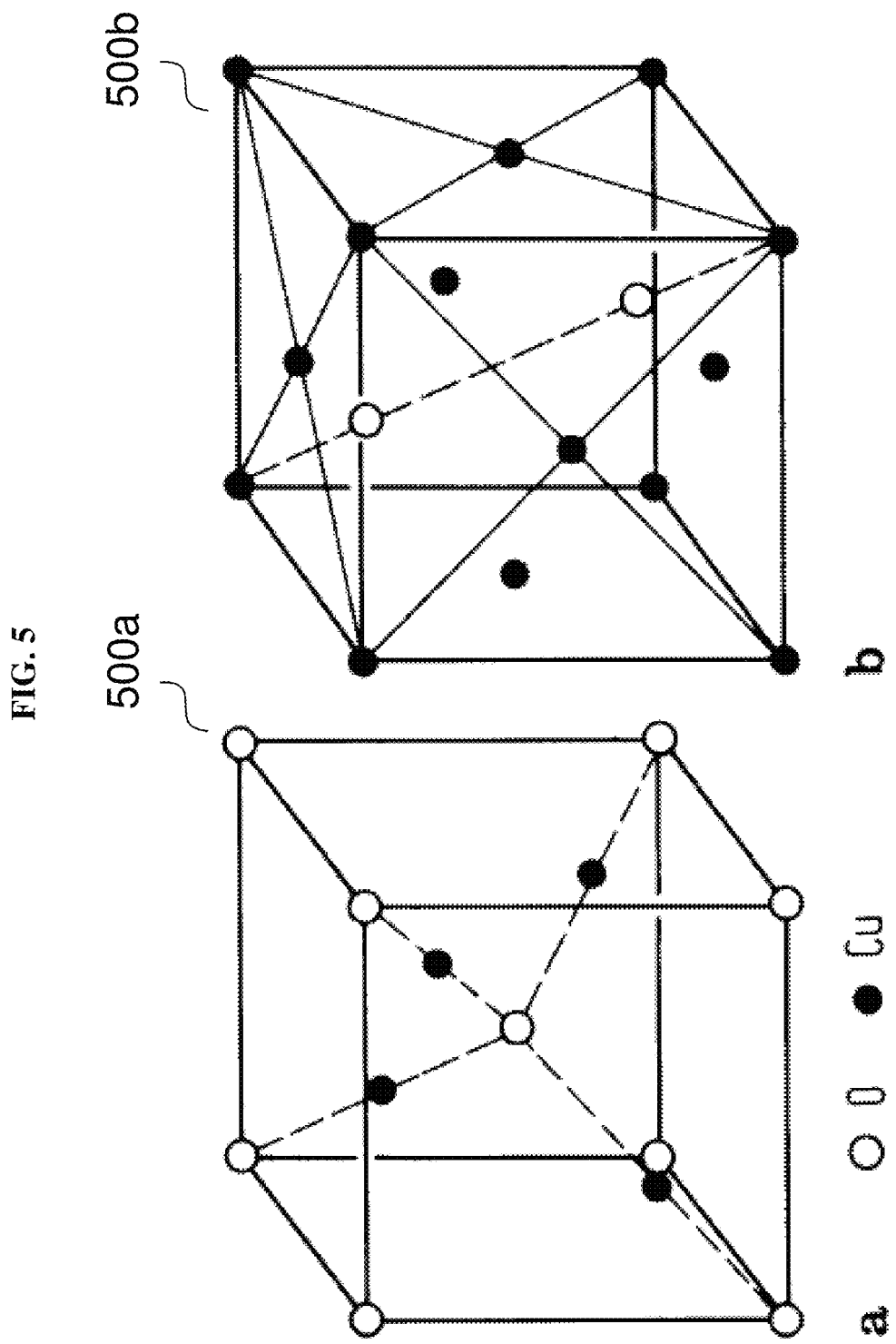
FIG. 5 is a schematic illustrating the crystal structure of copper (I) oxide ($Cu_2O$) according to various embodiments.

Furthermore, the crystalline structure and the lattice constant of the (200) textured $Cu_2O$ are very close to that of the MgO, which may be used as the underlayer to induce the epitaxial growth of the FePt. FIG. 5 is a schematic illustrating the crystal structure of copper (I) oxide ($Cu_2O$) according to various embodiments. The $Cu_2O$ layer may have similar crystalline structure as that of L10 ordered FePt or MgO (200). $Cu_2O$ may crystallize in a cubic structure with a lattice constant ($a_1$) of about 4.2696 Å. The O atoms may be arranged in a body centered cubic (bcc) sub-lattice as shown in 500a, and the Cu atoms may be arranged in a face centered cubic (fcc) sub-lattice as shown in 500b.

The developed $Cu_2O$ thermal control layer may be integrated into any HAMR media layout to control the thermal performance of the recording medium. The thermal property of the $Cu_2O$ layer may allow a relatively smaller laser power output from the NFT to be used for heating up the recording medium to the desired temperature during the writing process, which may be very critical to the whole HAMR system from the reliability viewpoint.

In various embodiments, Cu based heat sink layer (for FePt HAMR media) may be formed by utilizing the decomposition of the copper nitride layer at the high temperatures. One of the issues for seed-then-heat sink technology is the release of the $N_2$ from the copper nitride layer which may cause the deterioration of the surface morphology of the FePt film. The surface morphology deterioration may be due to the formation of the humps at the MgO surface prior the deposition of the FePt granular film.

By fully/partially replacing the MgO layer with $Cu_2O$, the nitrogen atoms from the copper nitride layer released at high temperature may be absorbed by $Cu_2O$ layer, preventing or reducing the formation of nitrogen gas molecules, thus addressing the surface morphology issue. The $Cu_2O$ layer may absorb the nitrogen atoms released from the copper nitride layer, thus reducing or eliminating the deterioration of the surface morphology of MgO layer and/or FePt layer on top.

Nitrogen doped $Cu_2O$ thin film may have an improved electrical conductivity, as well as improved thermal conductivity. With nitrogen doping, it may be possible to change the hole density by two orders of magnitude from $10^{15}$ to $10^{17}$ $cm^{-3}$. Due to the increased densities of holes, the thermal conductivity of nitrogen doped $Cu_2O$ may thus exhibit greater thermal conductivity with temperature. It may be postulated that nitrogen may be incorporated into oxygen sites and may form a shallow acceptor. The p-type conductivity may be due to C vacancies, which may introduce an acceptor level of about 0.3 eV above $E_v$.

The thermal control layer may allow a better thermal control for FePt based HAMR media during the writing process.

FIG. 6A is a table 600a illustrating the various conditions in which experiments have been carried out to form copper (I) oxide films according to various embodiments. The flow rate of argon (Ar) is fixed at 50 standard cubic centimeters per minute (sccm), and the flow rate of oxygen ($O_2$) is fixed at 5 standard cubic centimeters per minute (sccm).

Figure 6B:
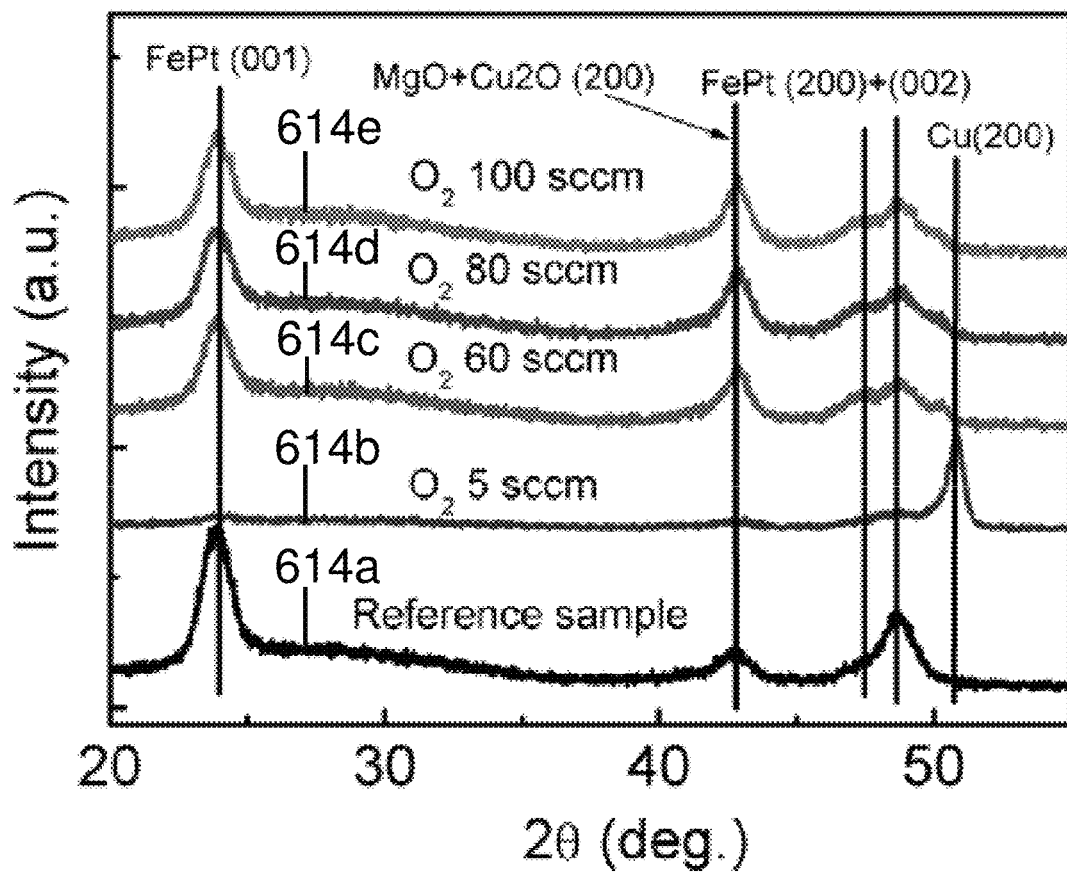
FIG. 6B is a plot of intensity (a.u. or arbitrary units) as a functions of angle 2$\theta$ (deg. or degrees) illustrating the X-ray diffraction (XRD) results of iron platinum (FePt) recording media with $CuO_x$ layer prepared by reactive sputtering at different oxygen gas ($O_2$) flow rates according to various embodiments.

FIG. 6B is a plot 600b of intensity (a.u. or arbitrary units) as a functions of angle 2θ (deg. or degrees) illustrating the X-ray diffraction (XRD) results of iron platinum (FePt) recording media with $CuO_x$ layer prepared by reactive sputtering at different oxygen gas ($O_2$) flow rates according to various embodiments. The basic layer structure of the reference sample is NiTa/MgO/FePt—C and the basic layer structure of the other samples is NiTa/MgO/$CuO_x$/FePt—C.

Figure 6C:
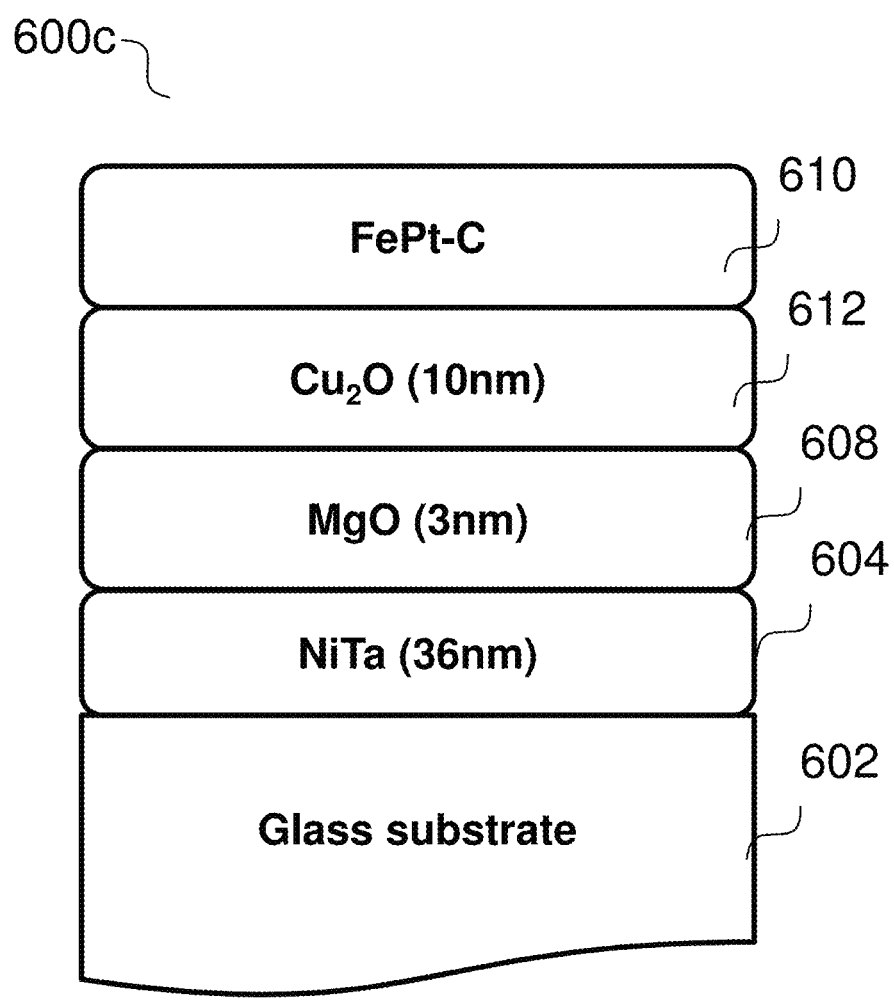
FIG. 6C is a schematic illustrating one example of a recording medium including copper (I) oxide layer according to various embodiments.

FIG. 6C is a schematic illustrating one example of a recording medium 600c including copper (I) oxide layer according to various embodiments. The recording medium 600c may include a glass substrate 602, NiTa seedlayer 604 (thickness about 36 nm) on the glass substrate 602, MgO underlayer 608 (thickness about 3 nm) on the NiTa seedlayer 604, $Cu_2O$ thermal control layer 612 (thickness about 10 nm) on the MgO underlayer 608, and carbon-doped FePt layer (FePt—C) 610 on the $Cu_2O$ thermal control layer 612. The thermal control layer 612 may be between the carbon-doped FePt layer (FePt—C) 610 and the underlayer 608. The thermal control layer 612 may be between the recording layer 610 and the underlayer 608.

From FIG. 6B, 614a is the XRD spectrum of the reference sample (i.e. the FePt layer is directly grown on the MgO layer and there is no $CuO_x$ layer) 614b is the XRD spectrum of the sample formed with 5 sccm of oxygen gas ($O_2$), 614c is the XRD spectrum of the sample formed with 60 sccm of $O_2$, 614d is the XRD spectrum of the sample formed with 80 sccm of $O_2$, and 614e is the XRD spectrum of the sample formed with 100 sccm of $O_2$.

The formation of the $Cu_2O$ may be able to ensure the good thermal performance of the whole HAMR media stack. Furthermore, it may also be very critical to maintain the heteroepitaxial growth of the MgO underlayer and the FePt granular recording layer. For samples formed with low $O_2$ flow rates (5 sccm), the textured metallic Cu (200) peak may be observed. No diffraction peaks from FePt (001) may be observed. Introducing $N_2$ during sputtering may also induce growth of Cu (200) at low temperatures. The $Cu_2O$ (200) diffraction peak is located at the same position as the MgO (200), and is indistinguishable from the MgO (200) peak. The intensity of the MgO (200) peak increases significantly with increasing $O_2$ content. The intensity of the Cu (200) diffraction peak decreases with increasing $O_2$ content and becomes very weak when the $O_2$ flow rate is greater than 40 sccm.

Figure 6D:
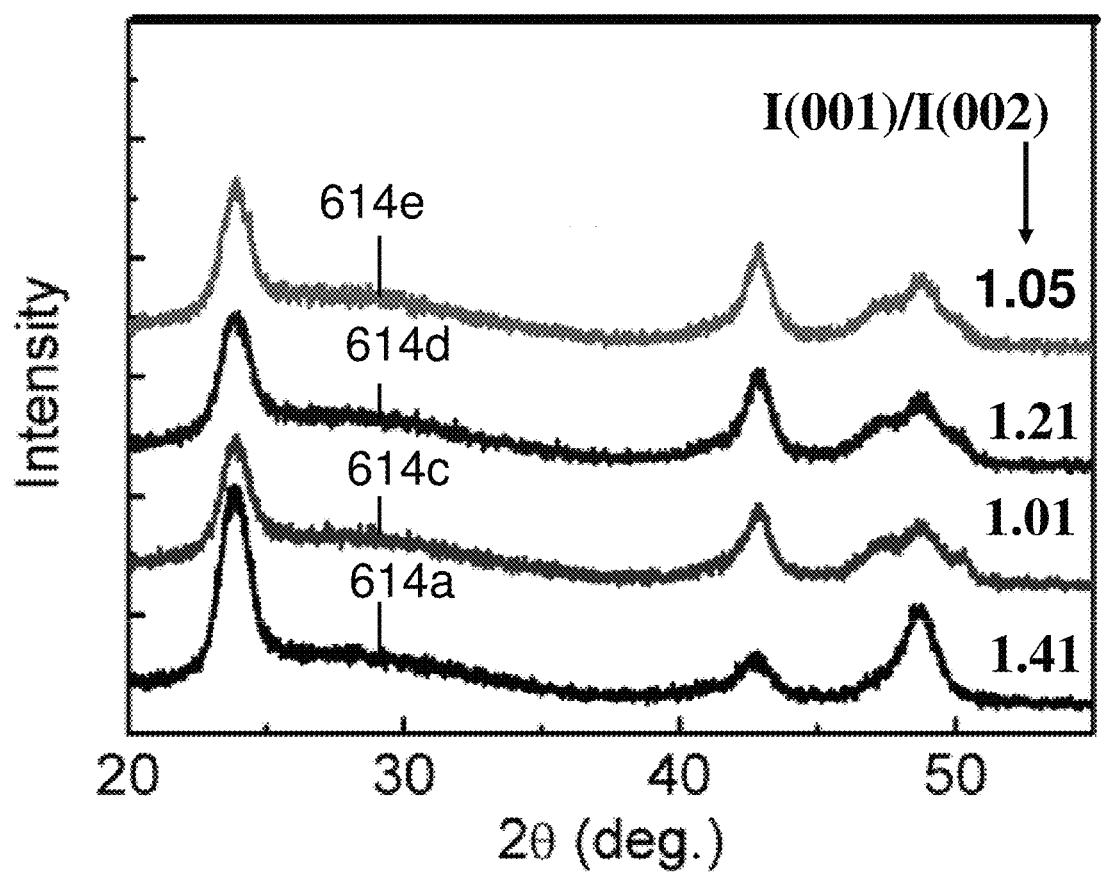
FIG. 6D is a plot of intensity (a.u. or arbitrary units) as a function of angle 2$\theta$ (deg. or degrees) illustrating some of the X-ray diffraction (XRD) results shown in FIG. 6B according to various embodiments.

FIG. 6D is a plot 600d of intensity (a.u. or arbitrary units) as a function of angle 2θ (deg. or degrees) illustrating some of the X-ray diffraction (XRD) results shown in FIG. 6B according to various embodiments. The ratio of the intensity of the FePt (001) peak to the intensity of the FePt (002) peak (I(001)/I(002)) is indicated in FIG. 6D. The ratios for 614a, 614c, 614d and 614e are 1.41, 1.01, 1.21 and 1.05 respectively.

Figure 6E:
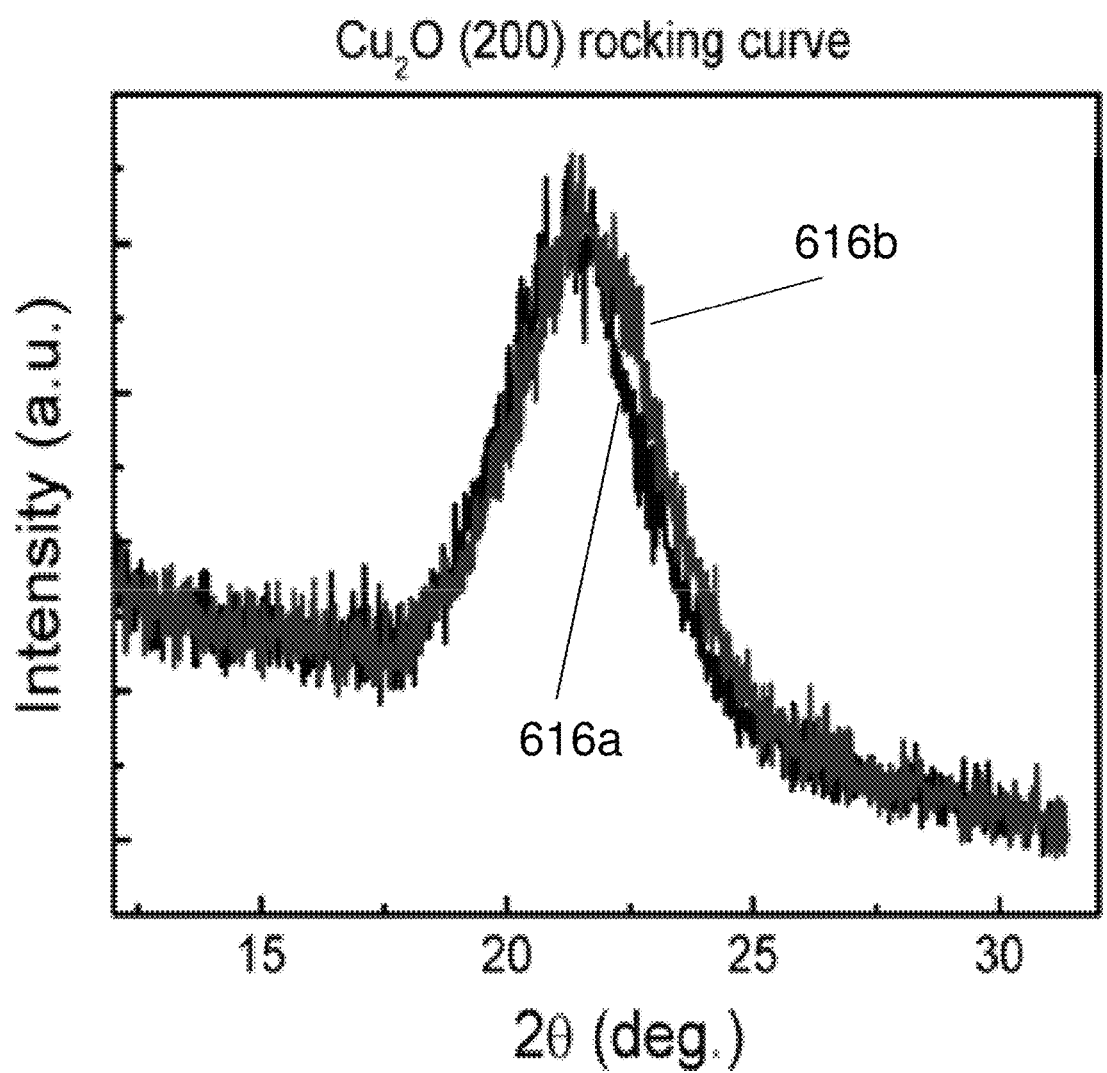
FIG. 6E is a plot of intensity (a.u. or arbitrary units) as a function of angle 2$\theta$ (deg. or degrees) illustrating the copper (I) oxide (200) rocking curve according to various embodiments.

FIG. 6E is a plot 600e of intensity (a.u. or arbitrary units) as a function of angle 2θ (deg. or degrees) illustrating the copper (I) oxide (200) rocking curve according to various embodiments. FIG. 6E shows the rocking curve measurement of the $Cu_2O$ (200) diffraction peak, with mosaic distribution about 3 degrees, which suggests the $Cu_2O$ (200) texture is well formed. 616a is the curve of the $Cu_2O$ film formed with 80 sccm, and has a mosaic distribution of about 3.03°. 616b is the curve of the $Cu_2O$ film formed with 100 sccm, and has a mosaic distribution of about 3.05°.

Figure 7:
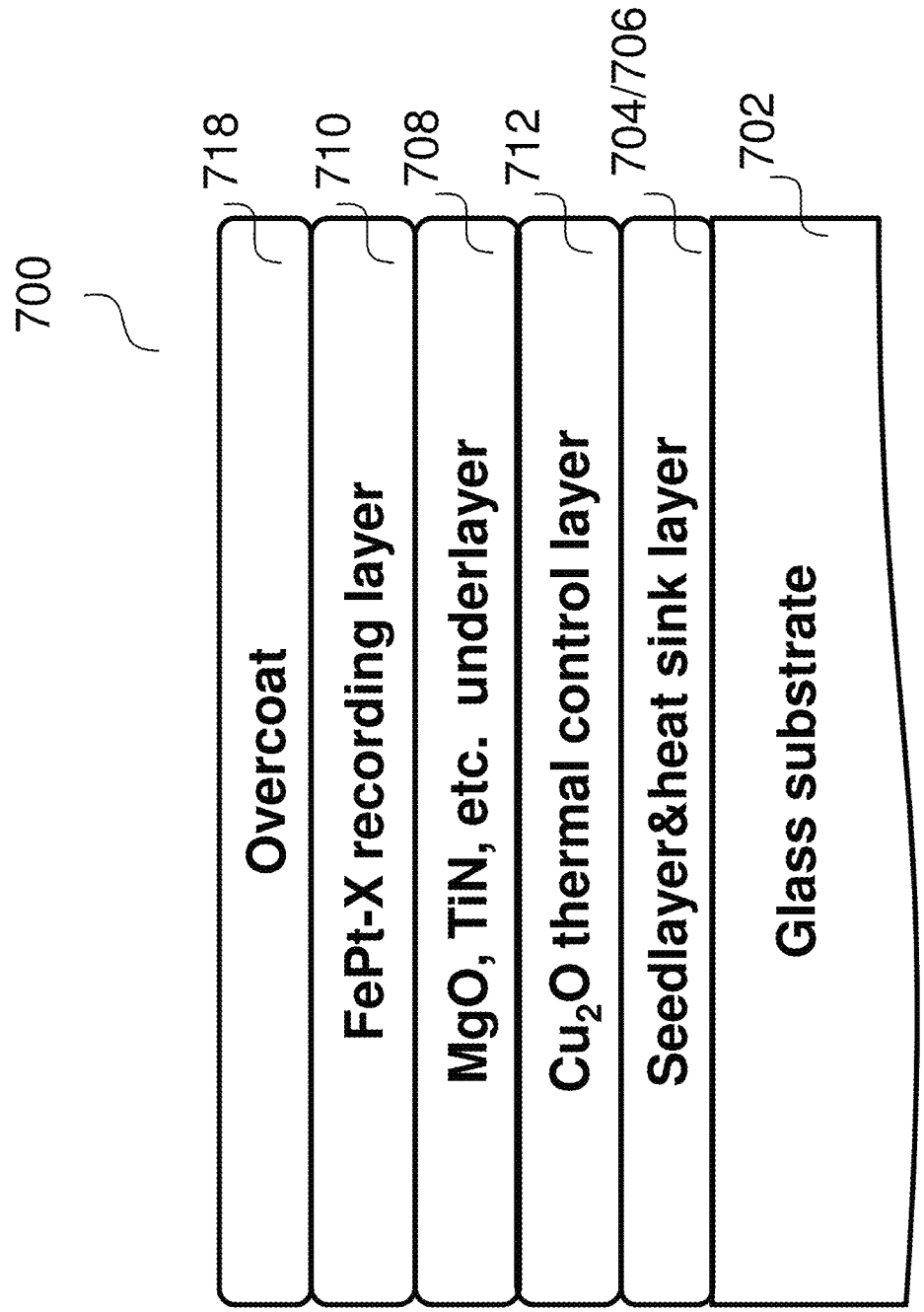
FIG. 7 is a recording medium according to various embodiments.

FIG. 7 is a recording medium 700 according to various embodiments. The recording medium 700 may include a glass substrate 702, a seedlayer 704 on the substrate 702, a heat sink layer 706 on the seedlayer 704, a $Cu_2O$ thermal control layer 712 on the heat sink layer 706, an underlayer 708 (which may include MgO, TiN etc.) on the thermal control layer 712, a FePt—X recording layer 710 on the underlayer 708, and an overcoat layer 718 on the recording layer. The recording medium 700 may be a HAMR magnetic recording medium.

A full stack HAMR medium 700 with copper nitride based heat sink layer 706 and $Cu_2O$ thermal control layer 712 as shown in FIG. 7 with basic structure of NiTa/Cu (Copper nitride)/$Cu_2O$/MgO (different thicknesses)/FePt—C may be prepared. The NiTa layer 704, the copper nitride layer 706, the $Cu_2O$ thermal control layer 712, and the MgO underlayer 708 may then be deposited or formed at room temperature. Subsequently, the disks may then be heated up at the heating station. The FePt—C composite film 710 may then be deposited or formed at the Triatron station just after the heating station.

Figure 8A:
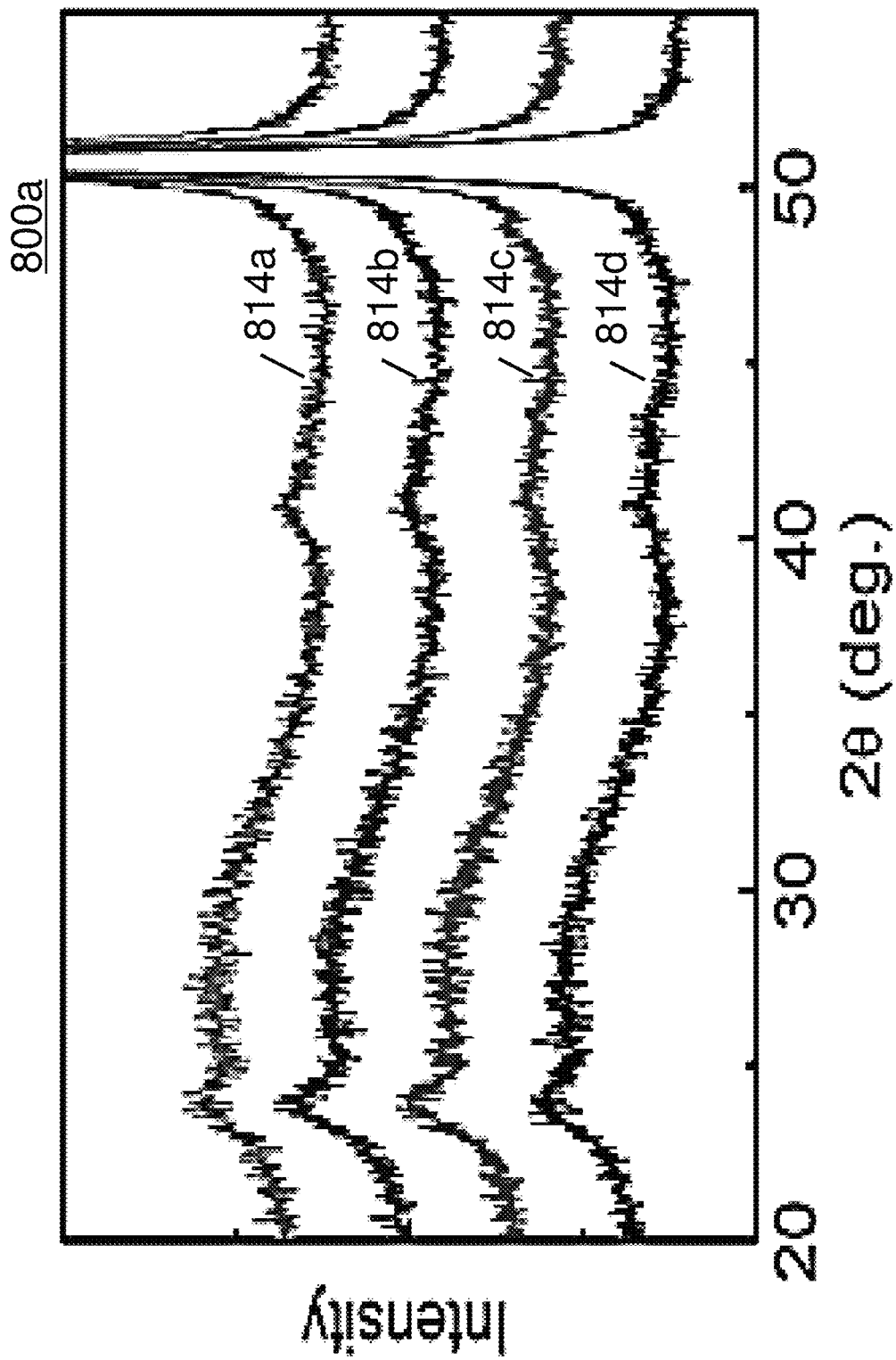
FIG. 8A is a plot of intensity (arbitrary units or a.u.) as a function of angle 2$\theta$ (degrees or deg.) illustrating the X-ray diffraction (XRD) results of samples with magnesium oxide (MgO) underlayers of different thicknesses according to various embodiments.

FIG. 8A is a plot 800a of intensity (arbitrary units or a.u.) as a function of angle 2θ (degrees or deg.) illustrating the X-ray diffraction (XRD) results of samples with magnesium oxide (MgO) underlayers of different thicknesses according to various embodiments. The thickness of Cu heat sink layer and the $Cu_2O$ thermal control layer are about 30 nm and about 15 nm respectively. 814a is the XRD spectrum for the sample in which the MgO layer is about 1.3 nm, 814b is the XRD spectrum for the sample in which the MgO layer is about 1.6 nm, 814c is the XRD spectrum for the sample in which the MgO layer is about 2.4 nm, and 814d is the XRD spectrum for the sample in which the MgO layer is about 3.0 nm.

It can be seen that the FePt (001) texture was developed with the inserted $Cu_2O$ intermediate layer. The relatively lower intensity of the diffraction peaks for FePt (001), MgO layer, and $Cu_2O$ layer may be due to the high intensity of the Cu (200).

Figure 8B:
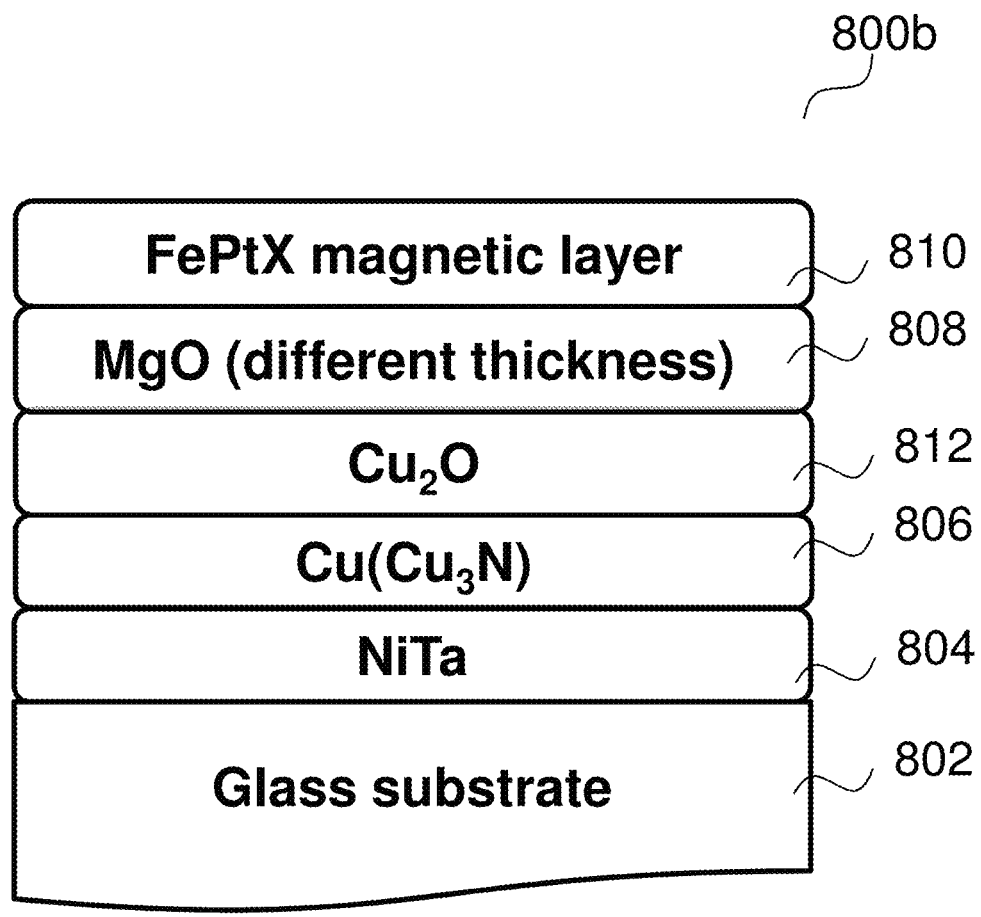
FIG. 8B is a schematic illustrating a recording medium according to various embodiments.

FIG. 8B is a schematic illustrating a recording medium 800b according to various embodiments. The recording medium 800b may include a glass substrate 802, a NiTa seed layer 804 on the glass substrate 802, a copper heat sink layer 806 (formed from $Cu_3N$) on the NiTa seedlayer 804, a $Cu_2O$ thermal control layer 812 on the copper heat sink layer 806, a MgO underlayer 808 on the $Cu_2O$ thermal control layer 812, and a FePtX magnetic layer 810 on the MgO underlayer 808. The thickness of the underlayer 808 may be varied in different experiments. As shown in FIG. 8B the underlayer 808 may be between the recording layer 810 and the thermal control layer 812.

Figure 8C:
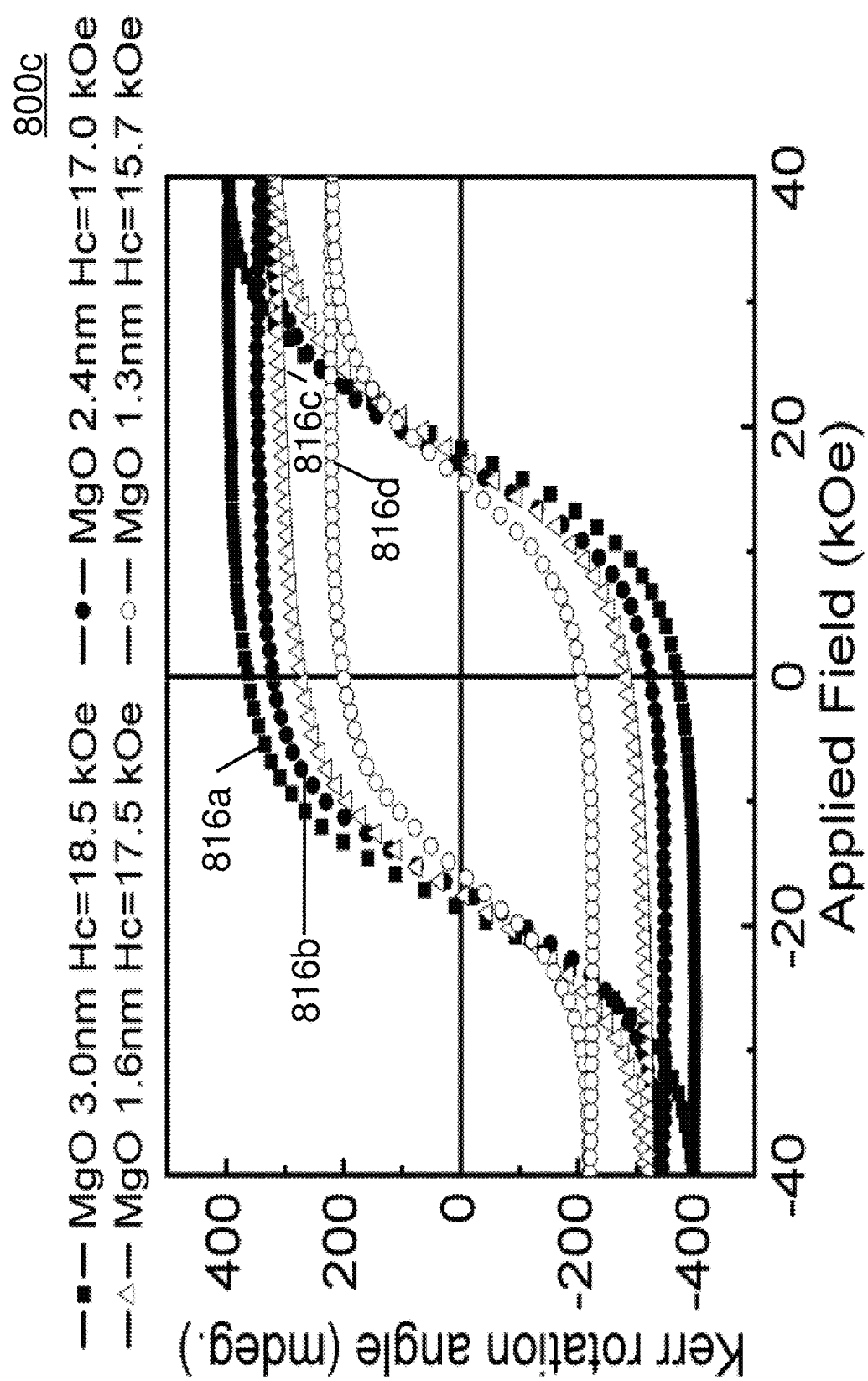
FIG. 8C is a plot of Kerr rotation angle (milli degrees or mdeg) as a function of applied field (kiloOersted or kOe) illustrating hysteresis loops of samples with magnesium oxide (MgO) underlayers of different thicknesses according to various embodiments.

FIG. 8C is a plot 800c of Kerr rotation angle (milli degrees or mdeg) as a function of applied field (kiloOersted or kOe) illustrating hysteresis loops of samples with magnesium oxide (MgO) underlayers of different thicknesses according to various embodiments. 816a relates to data for a sample with 3.0 mm MgO layer and has a coercivity value ($H_c$) of about 18.5 kOe; 816b relates to data for a sample with 2.4 nm MgO layer and has a coercivity value ($H_c$) of about 17.0 kOe; 816c relates to data for a sample with 1.6 nm MgO layer and has a coercivity value of 17.5 kOe, and 816d relates to data for a sample with 1.3 nm MgO layer and has a coercivity value of 15.7 kOe.

The hysteresis loops of the multilayer films with different MgO layer thicknesses are shown in FIG. 8C. It can be seen that the coercivity of the FePt—C composite films is larger than 15 kOe for all the samples. The coercivity increases with MgO layer thickness. The reason is the high temperature deposition process may induce the diffusion of the layer material adjacent to the MgO layer into the MgO layer, thus resulting in the deterioration of the MgO (200) texture and the magnetic properties of the FePt consequently. A thinner MgO layer may be more desirable from a mass production standpoint as the deposition rate of MgO is quite low.

Figure 9A:
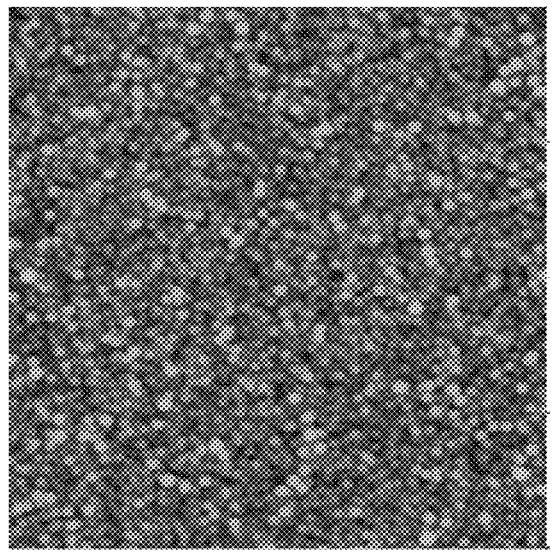
FIG. 9A is an atomic force microscopy (AFM) image of a heat assisted magnetic recording (HAMR) medium having the structure nickel tantalum (NiTa)/magnesium oxide (MgO) 3 nm/carbon-doped iron platinum (FePt—C) according to various embodiments.
Figure 9B:
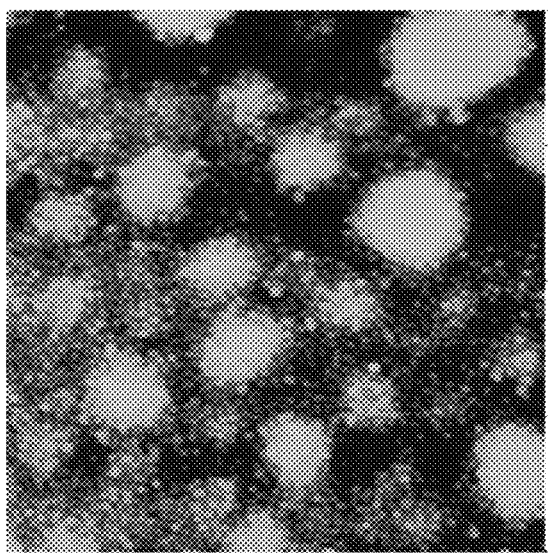
FIG. 9B is an atomic force microscopy (AFM) image of a heat assisted magnetic recording (HAMR) medium having the structure nickel tantalum (NiTa)/copper (from copper nitride)/magnesium oxide (MgO) 6 nm/carbon-doped iron platinum (FePt—C) according to various embodiments.

FIG. 9A is an atomic force microscopy (AFM) image 900a of a heat assisted magnetic recording (HAMR) medium having the structure nickel tantalum (NiTa)/magnesium oxide (MgO) 3 nm/carbon-doped iron platinum (FePt—C) according to various embodiments. FIG. 9B is an atomic force microscopy (AFM) image 900b of a heat assisted magnetic recording (HAMR) medium having the structure nickel tantalum (NiTa)/copper (from copper nitride)/magnesium oxide (MgO) 6 nm/carbon-doped iron platinum (FePt—C) according to various embodiments.

Figure 9C:
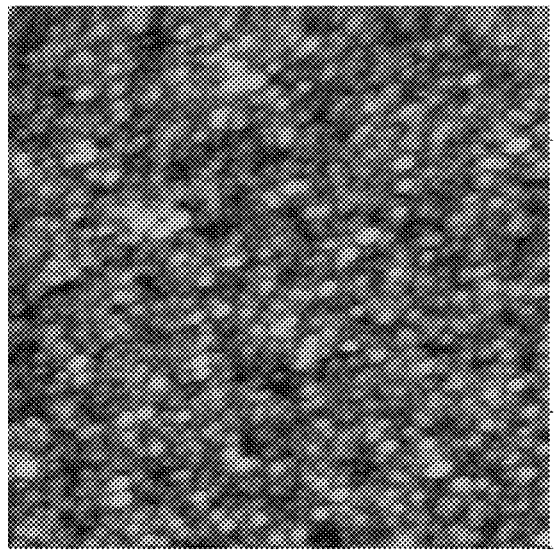
FIG. 9C is an atomic force microscopy (AFM) image of a heat assisted magnetic recording (HAMR) medium having the structure nickel tantalum (NiTa)/copper (from copper nitride)/copper (I) oxide ($Cu_2O$) 3 nm/magnesium oxide (MgO) 3 nm/carbon-doped iron platinum (FePt—C) according to various embodiments.

FIG. 9C is an atomic force microscopy (AFM) image 900c of a heat assisted magnetic recording (HAMR) medium having the structure nickel tantalum (NiTa)/copper (from copper nitride)/copper (I) oxide ($Cu_2O$) 3 nm/magnesium oxide (MgO) 3 nm/carbon-doped iron platinum (FePt—C) according to various embodiments.

The atomic deviation ($R_a$) for the sample shown in FIG. 9A is about 0.866 nm, the atomic deviation ($R_a$) for the sample shown in FIG. 9B is about 2.55 nm, and the atomic deviation ($R_a$) for the sample shown in FIG. 9C is about 0.79 nm.

The $R_a$ value for FePt—C composite film with MgO layer as shown in FIG. 9A is about 0.866 nm. By introducing the Cu based heat sink layer, the release of the $N_2$ during the decomposition of the copper nitride layer may deteriorate the morphology of the MgO underlayer, thus resulting in an increase in the overall surface roughness of the full stack HAMR medium to about $R_a$ of about 2.55 nm for the sample in FIG. 9B. When the thermal control layer $Cu_2O$ is inserted into the HAMR media stack, the surface roughness of the stack is reduced to about 0.79 nm for the sample shown in FIG. 9C. The dramatic reduction of the Ra value from about 2.55 nm to about 0.79 nm by the introduction of the $Cu_2O$ layer may be due to the ability of the $Cu_2O$ layer to prevent or reduce the $N_2$ gas formed from the transition of the copper nitride to copper. The nitrogen doping may cause the thermal conductivity of the $Cu_2O$ layer to vary more significantly with the temperature. The results suggest that introduction of the $Cu_2O$ layer into the HAMR medium structure may improve the surface morphology of the full stack HAMR medium, especially for HAMR media using the Cu based heat sink layer formed via decomposition of copper nitride.

Figure 10:
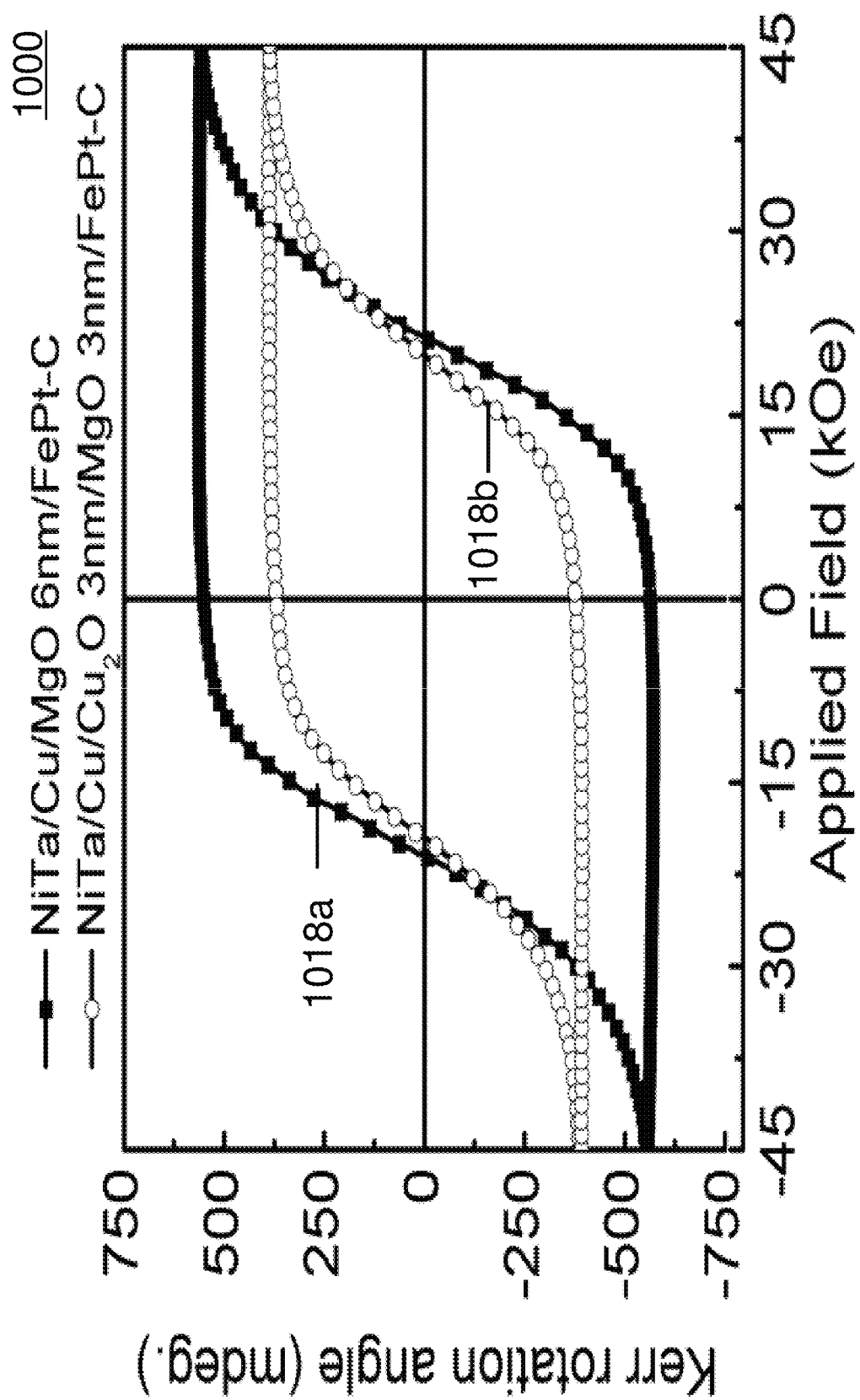
FIG. 10 is a plot of Kerr rotation angle (milli degrees or mdeg) as a function of applied field (kiloOersted or kOe) illustrating hysteresis loops of samples with structure glass/nickel tantalum (NiTa)/copper (Cu)/magnesium oxide (MgO) 6 nm/carbon doped iron-platinum (FePt—C), and structure glass/nickel tantalum (NiTa)/copper (Cu)/copper (I) oxide ($Cu_2O$) 3 nm/magnesium oxide (MgO) 3 nm/carbon doped iron-platinum (FePt—C) according to various embodiments.

FIG. 10 is a plot 1000 of Kerr rotation angle (milli degrees or mdeg) as a function of applied field (kilo-Oersted or kOe) illustrating hysteresis loops of samples with structure glass/nickel tantalum (NiTa)/copper (Cu)/magnesium oxide (MgO) 6 nm/carbon doped iron-platinum (FePt—C), and structure glass/nickel tantalum (NiTa)/copper (Cu)/copper (I) oxide ($Cu_2O$) 3 nm/magnesium oxide (MgO) 3 nm/carbon doped iron-platinum (FePt—C) according to various embodiments. The coercivity of the sample with 6 nm MgO layer is about 21.2 kOe, and the coercivity of the sample with 3 nm $Cu_2O$ layer and the reduced MgO layer thickness of 3 nm is slightly lower at about 18.8 kOe. The magnetic properties of the FePt—C composite films remains fairly good, suggesting that the $Cu_2O$ layer may partially replace the MgO layer, which may be very useful from mass production viewpoint.

The cooling time of FePt based medium according to various embodiments may be studied using a pump probe method.

Figure 11A:
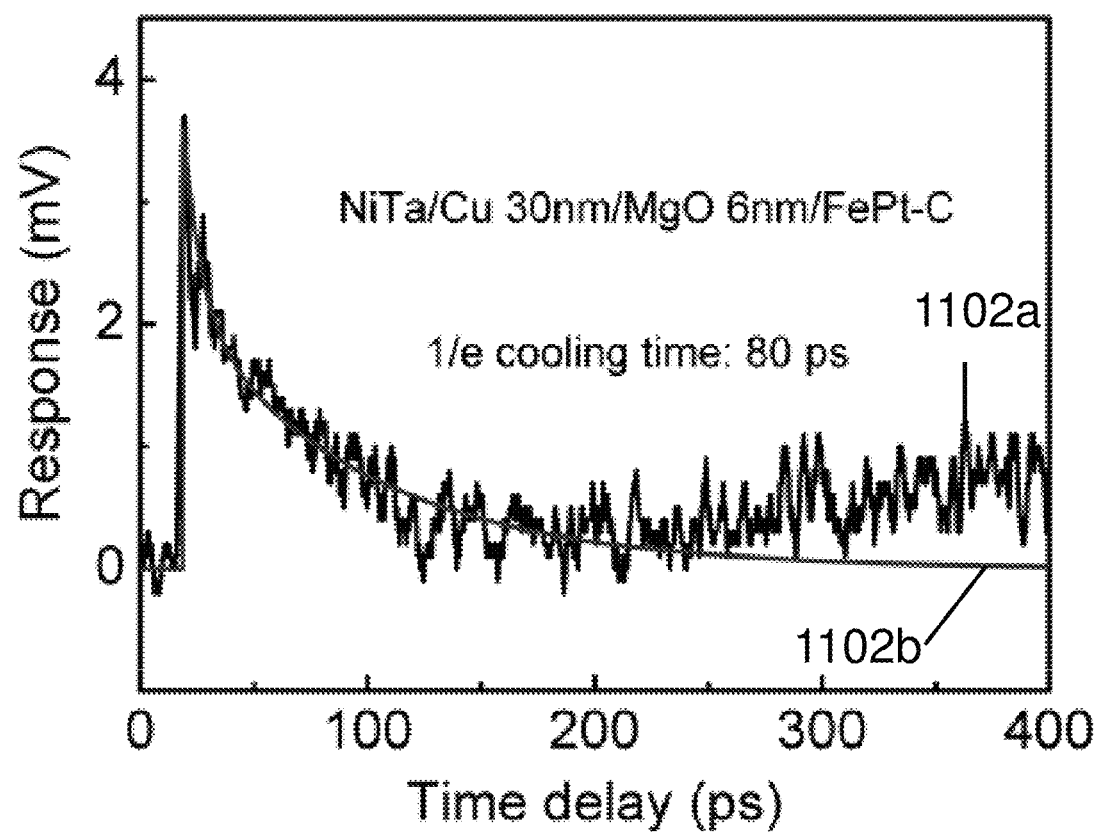
FIG. 11A is a plot of voltage response (millivolts or mV) as a function of time delay (picoseconds or ps) illustrating time domain thermal measurement results for a sample with structure nickel tantalum (NiTa)/copper (Cu) 30 nm/magnesium oxide (MgO) 6 nm/carbon doped iron platinum (FePt—C) according to various embodiments.

FIG. 11A is a plot 1100a of voltage response (millivolts or mV) as a function of time delay (picoseconds or ps) illustrating time domain thermal measurement results for a sample with structure nickel tantalum (NiTa)/copper (Cu) 30 nm/magnesium oxide (MgO) 6 nm/carbon doped iron platinum (FePt—C) according to various embodiments. 1102a is the optimized measurement results while 1102b is the fitting curve.

Figure 11B:
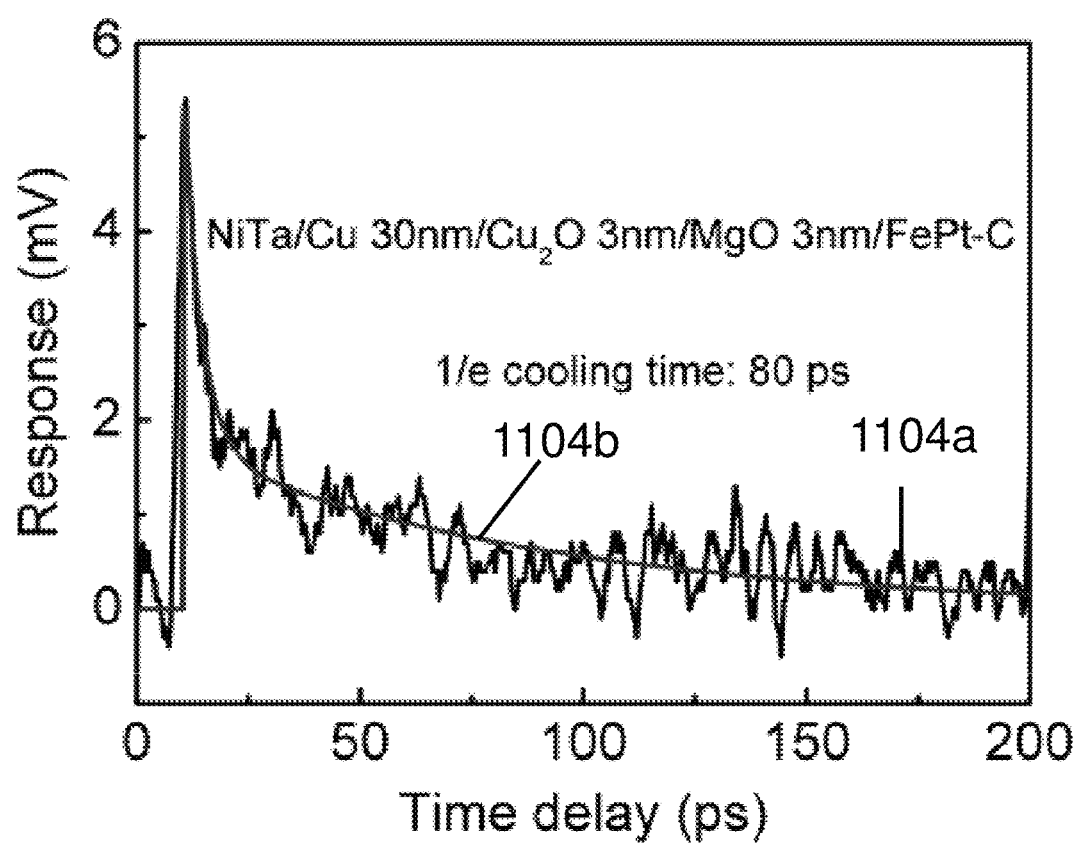
FIG. 11B is a plot of voltage response (millivolts or mV) as a function of time delay (picoseconds or ps) illustrating time domain thermal measurement results for a sample with structure nickel tantalum (NiTa)/copper (Cu) 30 nm/copper (I) oxide ($Cu_2O$) 3 nm/magnesium oxide (MgO) 3 nm/carbon doped iron platinum (FePt—C) according to various embodiments.

FIG. 11B is a plot 1100b of voltage response (millivolts or mV) as a function of time delay (picoseconds or ps) illustrating time domain thermal measurement results for a sample with structure nickel tantalum (NiTa)/copper (Cu) 30 nm/copper (I) oxide ($Cu_2O$) 3 nm/magnesium oxide (MgO) 3 nm/carbon doped iron platinum (FePt—C) according to various embodiments. 1104a is the optimized measurement results while 1104b is the fitting curve.

Figure 11C:
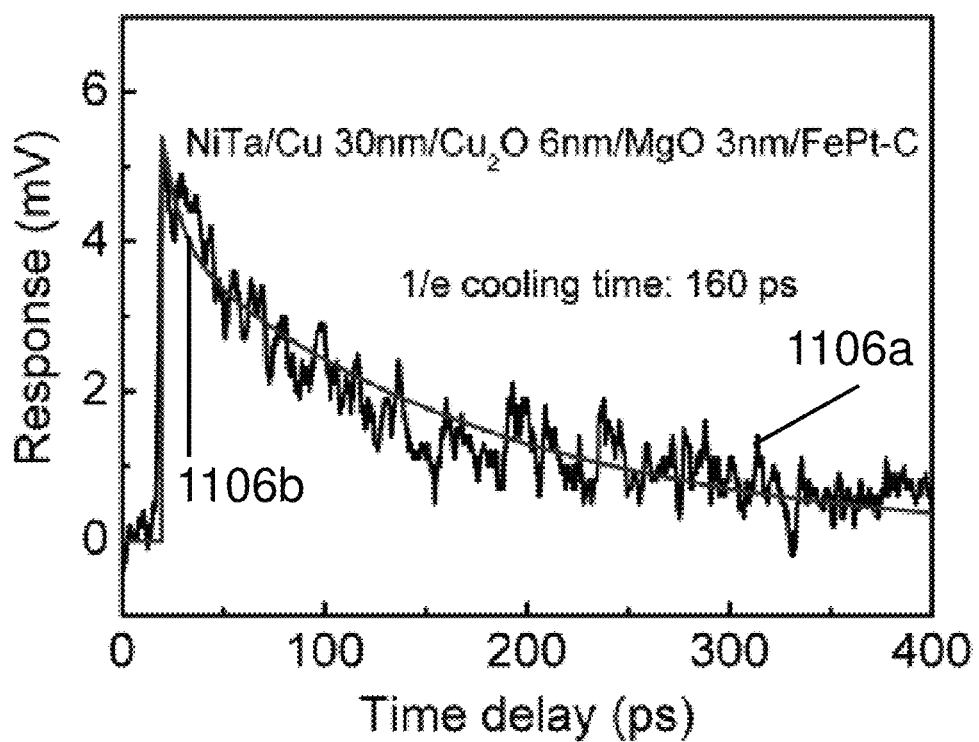
FIG. 11C is a plot of voltage response (millivolts or mV) as a function of time delay (picoseconds or ps) illustrating time domain thermal measurement results for a sample with structure nickel tantalum (NiTa)/copper (Cu) 30 nm/copper (I) oxide ($Cu_2O$) 6 nm/magnesium oxide (MgO) 3 nm/carbon doped iron platinum (FePt—C) according to various embodiments.

FIG. 11C is a plot 1100c of voltage response (millivolts or mV) as a function of time delay (picoseconds or ps) illustrating time domain thermal measurement results for a sample with structure nickel tantalum (NiTa)/copper (Cu) 30 nm/copper (I) oxide ($Cu_2O$) 6 nm/magnesium oxide (MgO) 3 nm/carbon doped iron platinum (FePt—C) according to various embodiments. 1106a is the optimized measurement results while 1106b is the fitting curve.

There may be two contributing factors in the measured curve: The first contributing factor is electron temperature rise which takes place within a few of ps; the second contributing factor is lattice temperature rise. Based on lattice temperature decay, the medium cooling time may be defined as the time at which the lattice temperature reaches 1/e of the maximal lattice temperature.

If the results for FePt—C films with 6 nm MgO layer (shown in FIG. 11A) are compared with the sample with 3 nm $Cu_2O$ and 3 nm MgO layer (shown in FIG. 11B), the cooling rate is about the same at about 80 ps. It seems that the $Cu_2O$ layer has about the same thermal conductivity value as that of MgO. The bulk MgO has the room temperature thermal conductivity of about 30-60 W/K*m while the thermal conductivity of the $Cu_2O$ is only about 5 W/k*m at room temperature. When the $Cu_2O$ layer thickness increases from 3 nm to 6 nm, the cooling rate dramatically increases from about 80 ps to about 160 ps. The no change in cooling rate for the sample with 3 nm $Cu_2O$ layer may be due to the reason that the thermal barrier need to have a minimal thickness to retard the heat flow. Based on the results above, the $Cu_2O$ layer is shown to be a very promising thermal control layer for FePt based HAMR media. The small thermal conductivity at the initial heating stage may allow a relatively smaller laser power to be used to heat up a FePt HAMR medium to the desired temperature during the writing process. The thermal properties of the HAMR media may be tuned via varying the thickness of the $Cu_2O$ layer, which is critical from application viewpoint. It may be more effective to tune the thickness of the $Cu_2O$ layer compared to varying the thickness of the MgO layer.

Figure 12:
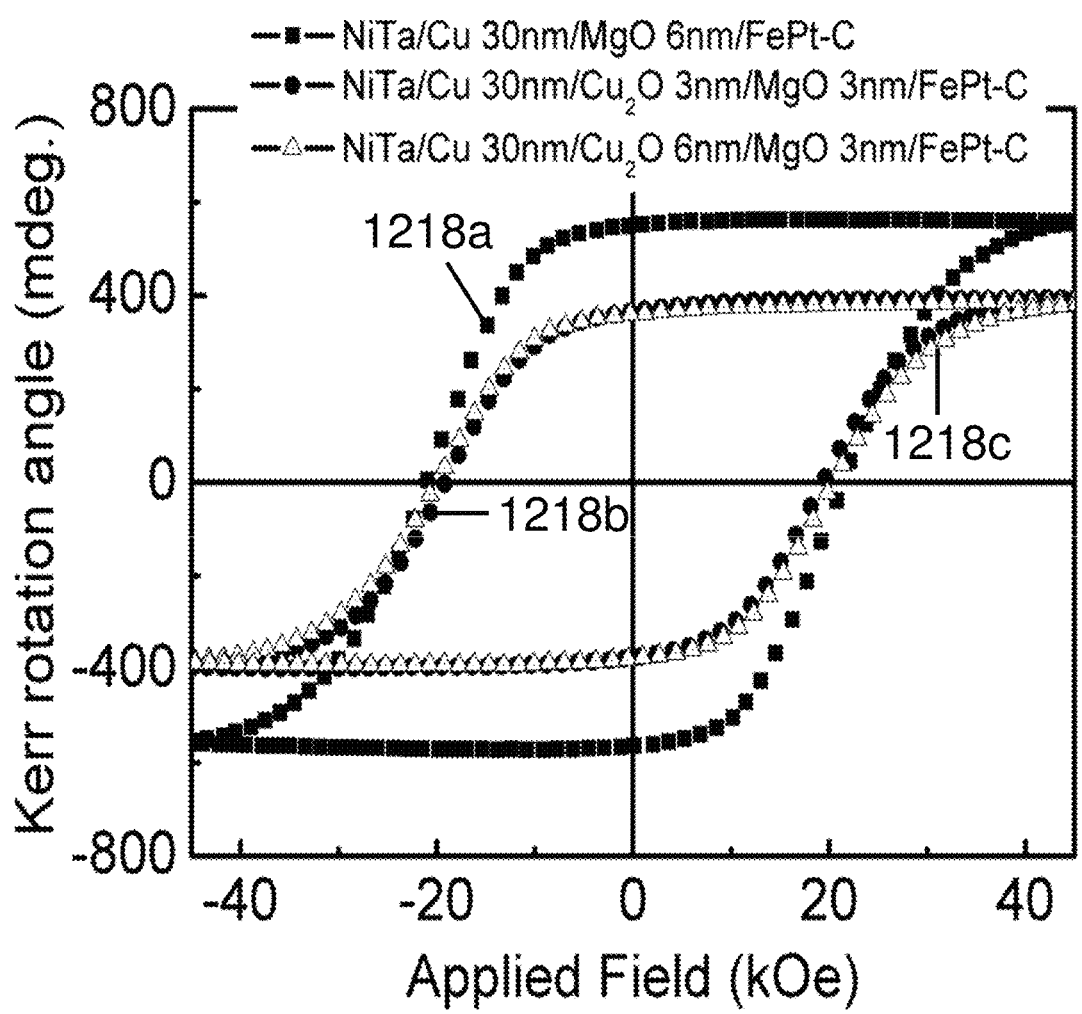
FIG. 12 is a plot of Kerr rotation angle (milli degrees or mdeg) as a function of applied field (kilo-Oersted or kOe) illustrating hysteresis loops of samples with structure nickel tantalum (NiTa)/copper (Cu) 30 nm/magnesium oxide (MgO) 6 nm/carbon doped iron platinum (FePt—C), structure nickel tantalum (NiTa)/copper (Cu) 30 nm/copper (I) oxide 3 nm/magnesium oxide (MgO) 3 nm/carbon doped iron platinum (FePt—C), and structure nickel tantalum (NiTa)/copper (Cu) 30 nm/copper (I) oxide 6 nm/magnesium oxide (MgO) 3 nm/carbon doped iron platinum (FePt—C) according to various embodiments.

FIG. 12 is a plot 1200 of Kerr rotation angle (milli degrees or mdeg) as a function of applied field (kilo-Oersted or kOe) illustrating hysteresis loops of samples with structure nickel tantalum (NiTa)/copper (Cu) 30 nm/magnesium oxide (MgO) 6 nm/carbon doped iron platinum (FePt—C), structure nickel tantalum (NiTa)/copper (Cu) 30 nm/copper (I) oxide 3 nm/magnesium oxide (MgO) 3 nm/carbon doped iron platinum (FePt—C), and structure nickel tantalum (NiTa)/copper (Cu) 30 nm/copper (I) oxide 6 nm/magnesium oxide (MgO) 3 nm/carbon doped iron platinum (FePt—C) according to various embodiments.

1218a represents the hysteresis loop for nickel tantalum (NiTa)/copper (Cu) 30 nm/magnesium oxide (MgO) 6 nm/carbon doped iron platinum (FePt—C). 1218b represents the hysteresis loop for nickel tantalum (NiTa)/copper (Cu) 30 nm/copper (I) oxide 3 nm/magnesium oxide (MgO) 3 nm/carbon doped iron platinum (FePt—C). 1218c represents the hysteresis loop for nickel tantalum (NiTa)/copper (Cu) 30 nm/copper (I) oxide 6 nm/magnesium oxide (MgO) 3 nm/carbon doped iron platinum (FePt—C).

FIG. 12 shows the hysteresis loops of the samples discussed in FIG. 10, with the addition of a sample having a thicker copper (I) oxide ($Cu_2O$) layer. It may be seen that the introduction of the thicker $Cu_2O$ layer does not deteriorate or affect the texture and/or magnetic properties of the FePt—C composite film too much.

Various embodiments relate to FePt based heat-assisted-magnetic-recording (HAMR) media fabrication and application. Various embodiments include a $Cu_2O$ thermal control layer for FePtX based HAMR media for improved thermal design. The temperature dependent thermal conductivity of the $Cu_2O$ layer may enable it to act as the thermal barrier layer at the initial heating of the recording medium, thus allowing a relatively lower laser power to be used. The reduction of the required laser power may improve the reliability of the whole HAMR system. Various embodiments may allow the release of the power requirement of the near field transducer (NFT). The thermal conductivity of the $Cu_2O$ layer may dramatically or significantly increase with increasing temperature, thus allowing faster cooling of the HAMR medium once the temperature reaches a certain value.

The thermal properties of the $Cu_2O$ layer may enable better thermal management of the HAMR medium during the writing process. The $Cu_2O$ layer may be integrated into any HAMR medium layout to improve the thermal performance of the recording medium. In various embodiments, the texture of $Cu_2O$ (200) may allow the growth of (001) textured FePt film on top of the $Cu_2O$ layer.

For a FePt based full stack HAMR medium with Cu based heat sink layer, the high temperature process may convert the copper nitride based underlayer to a copper based heat sink layer, which may enable a more efficient cooling rate of recording medium during the writing process. However, the release of $N_2$ from the copper nitride layer may result in the surface morphology deterioration of the MgO layer, thus affecting the full HAMR medium stack.

In various embodiments, the $Cu_2O$ intermediate layer may absorb nitrogen, thus preventing the surface morphology deterioration of the MgO layer. Furthermore, the nitrogen doped $Cu_2O$ layer may enhance the temperature dependent thermal conductivity of $Cu_2O$ layer, making it an even better thermal control layer to manage the heating and cooling process of the FePt based HAMR medium during the writing process.

In various embodiments, a recording medium may include a thermal control $Cu_2O$ layer between the $Cu_3N$ heat sink layer and the MgO underlayer. The $Cu_2O$ layer may absorb the released nitrogen from the $Cu_3N$ layer during the $Cu_3N$ decomposition process, thus significantly improving the surface roughness of the recording medium.

$Cu_2O$ may have a higher deposition rate compared to MgO. Partial replacement of MgO by $Cu_2O$ layer may increase the throughput of HAMR media from mass production viewpoint. The thickness of the MgO layer may be reduced down to about 2 nm by the partial replacement with $Cu_2O$. The HAMR medium with the layout as described herein may be applied for HAMR media application.

Thermal performance measurements indicate that the cooling rate may be controlled by tuning the thickness of the $Cu_2O$ layer, which is more effective compared to varying the thickness of the MgO layer.

Various embodiments may also relate to a fabrication process of forming the recording medium.

In the context of various embodiments, the term "underlayer" may mean a layer arranged beneath a recording layer, for example between the recording layer and a substrate.

In the context of various embodiments, the term "recording layer" may include a storage layer. The recording layer may mean a layer where data or information may be stored or written to or read from.

In the context of various embodiments, the term "texture" with regard to a material may refer to a crystallographic orientation of the material.

In the context of various embodiments, the term "epitaxial" may mean that an overlayer formed or deposited over an underlying layer may have at least one defined orientation (e.g. a controlled orientation) with respect to the crystal structure or crystallographic orientation of the underlying layer. In this way, an epitaxial overlayer formed on the underlying layer or an overlayer having an epitaxial growth relationship with an underlying layer may mean that there is a defined relationship between the respective crystal structures or orientations of the overlayer and the underlying layer, as opposed to a random orientation of the crystal structure of the overlayer relative to that of the underlying layer.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A recording medium for heat assisted magnetic recording (HAMR), the recording medium comprising:
   a substrate;
   a recording layer; and
   a thermal control layer between the recording layer and the substrate;
   wherein the thermal control layer has a thermal conductivity that increases with temperature, wherein the thermal control layer comprises copper (I) oxide.

2. The recording medium according to claim 1,
   wherein the thermal control layer is doped with nitrogen.

3. The recording medium according to claim 1, further comprising:
   a heat sink layer between the thermal control layer and the substrate.

4. The recording medium according to claim 3,
   wherein the heat sink layer comprises copper.

5. The recording medium according to claim 4,
   wherein the copper is formed by depositing copper nitride and heating the copper nitride.

6. The recording medium according to claim 1, further comprising:
   an underlayer between the recording layer and the substrate.

7. The recording medium according to claim 6,
   wherein the underlayer comprises at least one of magnesium oxide, titanium carbide, titanium nitride and platinum.

8. The recording medium according to claim 6,
   wherein the underlayer is between the recording layer and the thermal control layer.

9. The recording medium according to claim 1,
   wherein the thermal control layer has a thickness selected from a range of about 3 nm to about 6 nm.

10. The recording medium according to claim 1,
    wherein the recording layer comprises iron-platinum.

11. The recording medium according to claim 1, further comprising:
    a seed layer between the substrate and the thermal control layer.

12. The recording medium according to claim 11,
    wherein the seed layer comprises nickel tantalum.

13. The recording medium according to claim 1, further comprising:
    an overcoat layer on the recording layer.

14. A method of forming a recording medium for heat assisted magnetic recording (HAMR), the method comprising:
    providing a substrate;
    forming a recording layer; and
    forming a thermal control layer between the recording layer and the substrate;
    wherein the thermal control layer has a thermal conductivity that increases with temperature; and
    wherein the thermal control layer comprises copper (I) oxide.

15. The method according to claim 14,
    wherein the thermal control layer is formed before forming the recording layer.

16. The method according to claim 14, further comprising:
    forming a heat sink layer between the thermal control layer and the substrate.

17. The method according to claim 16,
    wherein the heat sink layer comprises copper.

18. The method according to claim 17,
    wherein forming the heat sink layer comprises:
    depositing copper nitride; and
    heating the copper nitride to form copper.

19. The method according to claim 18,
    wherein heating of the copper nitride forms nitrogen; and, wherein nitrogen is absorbed by the thermal control layer.

* * * * *